US008885942B2

(12) United States Patent
Tsukidate

(10) Patent No.: US 8,885,942 B2
(45) Date of Patent: Nov. 11, 2014

(54) OBJECT MAPPING DEVICE, METHOD OF MAPPING OBJECT, PROGRAM AND RECORDING MEDIUM

(75) Inventor: Ryota Tsukidate, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 415 days.

(21) Appl. No.: 13/394,426

(22) PCT Filed: Jun. 9, 2011

(86) PCT No.: PCT/JP2011/003263
§ 371 (c)(1),
(2), (4) Date: Mar. 6, 2012

(87) PCT Pub. No.: WO2012/004933
PCT Pub. Date: Jan. 12, 2012

(65) Prior Publication Data
US 2012/0170847 A1    Jul. 5, 2012

(30) Foreign Application Priority Data
Jul. 9, 2010 (JP) ................................. 2010-156517

(51) Int. Cl.
*G06K 9/46* (2006.01)
*G06F 17/30* (2006.01)

(52) U.S. Cl.
CPC .... *G06F 17/30265* (2013.01); *G06F 17/30247* (2013.01)
USPC .......................................... 382/190; 382/118

(58) Field of Classification Search
None
See application file for complete search history.

(56) References Cited

U.S. PATENT DOCUMENTS

2010/0156834 A1* 6/2010 Sangster ........................ 345/173
2013/0188844 A1* 7/2013 Goldberg ...................... 382/118

FOREIGN PATENT DOCUMENTS

| JP | 2002-169810 |   | 6/2002 |
| JP | 2002169810 A | * | 6/2002 |
| JP | 2007-114931 |   | 5/2007 |
| JP | 2010-26661 |   | 2/2010 |

OTHER PUBLICATIONS

International Search Report issued Jul. 12, 2011 in International (PCT) Application No. PCT/JP2011/003263.
Atsushi Usui et al., "Face-Based Image Retrieval under Age Variation Using Relevance Feedback", IPSJ SIG Technical Report, Mar. 6, 2009, vol. 2009, No. 29, pp. 217 to 222, 2009-CVIM-166 along with English abstract.

* cited by examiner

*Primary Examiner* — Kim Vu
*Assistant Examiner* — Fred Hu
(74) *Attorney, Agent, or Firm* — Wenderoth, Lind & Ponack, L.L.P.

(57) ABSTRACT

A device stores therein contents and time information pieces each indicating time at which the corresponding content was generated; categorizes, into first and second groups, objects included in contents corresponding to time information pieces indicating times within a first period and a second period that partially overlap, the first group composed of objects that are included in contents corresponding to time information pieces indicating times within the first period and are similar to each other, and the second group composed of objects that are included in contents corresponding to time information pieces indicating times within the second period and are similar to each other; and when a number of objects belonging to both the first and second groups is greater than or equal to a predetermined number, associates the objects belonging to the first group with the objects belonging to the second group as objects indicating a same entity.

9 Claims, 26 Drawing Sheets

FIG. 3

| File name | Image data | Shooting date and time |
|---|---|---|
| aaaa.jpg | | 2010:06:13 16:33:56 |
| bbbb.jpg | | 2010:06:14 15:32:55 |
| ⋮ | ⋮ | ⋮ |
| xyxy.jpg | | 2030:08:24 15:42:11 |

FIG. 5

Object detection information table  500

| Object ID | File name | Feature value | Shooting date and time |
|---|---|---|---|
| OBJ0001 | aaaa.jpg | (152, 669, ···) | 2010:06:13 16:33:56 |
| OBJ0002 | aaaa.jpg | (245, 321, ···) | 2010:06:13 16:33:56 |
| ⋮ | ⋮ | ⋮ | ⋮ |
| OBJ1080 | xyxy.jpg | (263, 755, ···) | 2030:08:24 15:42:11 |

Divided period data table  700

| Divided period ID | Starting date and time | Ending date and time |
|---|---|---|
| DP001 | 2010:06:13 16:33:56 | 2010:11:05 12:21:45 |
| DP002 | 2010:11:06 08:05:49 | 2011:05:08 20:15:11 |
| ⋮ | ⋮ | ⋮ |
| DP040 | 2029:05:31 21:54:35 | 2030:08:24 15:42:11 |

Cluster information table                              900

| Cluster ID | Object ID | Divided period ID |
|---|---|---|
| CLS001 | OBJ0001、OBJ0002、··· | DP001 |
| CLS002 | OBJ0025、···OBJ0099、OBJ0100 | |
| CLS003 | OBJ0099、OBJ0100、···OBJ0168 | DP002 |
| CLS004 | OBJ0169、··· | |
| ⋮ | ⋮ | ⋮ |

FIG. 11

Association information table  970

| | First cluster ID | Second cluster ID |
|---|---|---|
| Association 1 | CLS002 | CLS003 |
| Association 2 | CLS003 | CLS005 |
| Association 3 | CLS004 | CLS006 |
| Association 4 | CLS005 | CLS007 |
| Association 5 | CLS006 | CLS008 |
| Association 6 | CLS007 | CLS009 |
| Association 7 | CLS008 | CLS010 |

FIG. 23

Period length correspondence table 2300

| Age range | Period length |
|---|---|
| 0-3 years old | 1 month |
| 4-6 years old | 2 months |
| 7-12 years old | 3 months |
| 13-15 years old | 6 months |
| 16-60 years old | 1 year |
| 61-79 years old | 6 months |
| 80 years old and above | 3 months |

FIG. 25

Associated cluster ID group list  2500

| Cluster group ID | Associated cluster ID group |
|---|---|
| CS001 | CLS001 |
| CS002 | CLS002、CLS003、CLS005、CLS007、CLS009 |
| CS003 | CLS004、CLS006、CLS008、CLS010 |

OBJECT MAPPING DEVICE, METHOD OF MAPPING OBJECT, PROGRAM AND RECORDING MEDIUM

TECHNICAL FIELD

The present invention relates to technology for associating objects (e.g., photo-subjects) included in a plurality of contents, such as digital photographs and other images, based on the sameness of the objects.

BACKGROUND ART

Conventionally used method for associating human faces in a plurality of images as the same person is to detect the facial part of a person from each image, extract a feature value (e.g., a group of features useful for face recognition, such as the distance between facial parts like eyes, mouth, etc.) of a face from each facial part, and perform clustering based on the feature values thus extracted.

Accordingly, people having similar feature values of faces are grouped into the same cluster, whereas people having dissimilar feature values of faces are separated into different clusters. This makes it possible to judge the sameness of people based on whether the people belong to the same cluster and, if the people are judged to be the same person, to associate the faces of the people with each other.

However, the face of a person changes over time due to the growth, aging, etc. of the person. Therefore, in the case where clustering is performed simply based on the feature values of faces, images that each include the face of the same person but were captured at a very different stage of the person's life may be separated into different clusters.

A known technology for associating people who were judged to be the same person, in consideration of the change in growth, aging, etc., is to judge the sameness of people with use of statistical data obtained by statistically calculating the change of a feature value due to the aging of a human (see Patent Literature 1, for example).

CITATION LIST

Patent Literature

[Patent Literature 1]
Japanese Patent Application Publication No. 2007-114931

SUMMARY OF INVENTION

Technical Problem

However, the above technology uses statistical data obtained by statistically calculating the change of a feature value. Therefore, in the case of judging the sameness of a person whose change is different from what is indicated by the statistical data, the accuracy of the judgment will be lowered. Examples of the change include a change due to growth more rapid than the growth of ordinary people, a change due to gaining or losing weight, etc.

Accordingly, with the conventional technology, it is difficult to accurately associate people in a plurality of images as being the same person captured at very different stages of the person's life.

A similar problem may arise even if an object is something other than a human face (e.g., an animal, a plant, etc). Also, such a problem may arise even if the contents are something other than images. For example, suppose that the contents are audio and the objects are each the voice of a person. In this case, the voice in each content may not be judged since the voice of the same person as the feature of the voice changes due to aging.

The present invention has been achieved in view of the above problems, and an aim thereof is to provide an object associating device, an object associating method, a program, and a recording medium, each of which is for accurately associating objects included in a plurality of contents and indicating the same entity (i.e., target), even when the features of the objects change over time.

Solution to Problem

In order to solve the above problems, the present invention provides an object associating device comprising: a storage unit storing therein a plurality of contents and a plurality of generation time information pieces in one-to-one correspondence, each generation time information piece indicating time at which the corresponding content was generated; a categorizing unit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and an associating unit configured to, when a number of objects belonging to both the first group and the second group is greater than or equal to a predetermined number, associate the objects belonging to the first group with the objects belonging to the second group as objects indicating a same entity.

Here, each object is included in a different one of the contents. Thus, one object is not included in more than one content.

Advantageous Effects of Invention

Even if the feature of each object indicating the same entity changes in a combined period, which is composed of the first period and the second period, the change of the entity in each of the first period and the second period that are shorter than the combined period is considered to be smaller than the change of the entity in the entirety of the combined period.

Therefore, categorizing the objects in each of the first period and the second period is less susceptible to the change of the features of the objects over time than categorizing the objects in the entirety of the combined period. This makes it possible to accurately categorize the objects indicating the same entity into the same group.

Also, the entity indicated by the objects belonging to both the first group and the second group is the same as the entity indicated by the objects only belonging to the first group and the objects only belonging to the second group.

Therefore, if the number of objects belonging to both the first group and the second group is greater than or equal to the predetermined number, the objects only belonging to the first group, the objects only belonging to the second group, and the objects belonging to both the first group and the second group all indicate the same entity. Accordingly, the object associating device associates the objects belonging to the first group with the objects belonging to the second group.

As described above, the object associating device associates the objects in the combined period composed of the first period and the second period, with use of the result of categorization accurately performed in each of the first period and the second period. Therefore, the objects indicating the same entity are associated more accurately than in the conventional technology.

A result of the association can be used for processing that is performed based on the sameness of objects. Examples of such processing include searching and sorting.

BRIEF DESCRIPTION OF DRAWINGS

FIG. 3 shows the data structure and details of an image group 300.

FIG. 5 shows the data structure and details of each object detection information pieces included in an object detection information table 500.

FIG. 7 shows the structure and details of divided period data pieces included in a divided period data table 700.

FIG. 9 shows the data structure and details of cluster information pieces included in a cluster information table 900.

FIG. 11 indicates the data structure and details of association information pieces included in an association information table 970.

FIG. 12A is a selection screen 981 for encouraging a user to select an object as a search key, and FIG. 12B is a result screen 982 for presenting a search result to the user.

FIG. 23 is a flowchart showing a period length correspondence table 2300.

FIG. 25 shows the data structure and details of associated cluster ID group list 2500 including a plurality of associated cluster group information pieces.

DESCRIPTION OF EMBODIMENTS

1. Embodiment 1

The following describes an image management device 100, as an object associating device according to Embodiment 1 of the present invention. The image management device 100 stores images as contents, and searches for images showing a certain person, based on objects (the human faces in the present embodiment) indicating photo-subjects included in the images thus stored.

Figure 1:
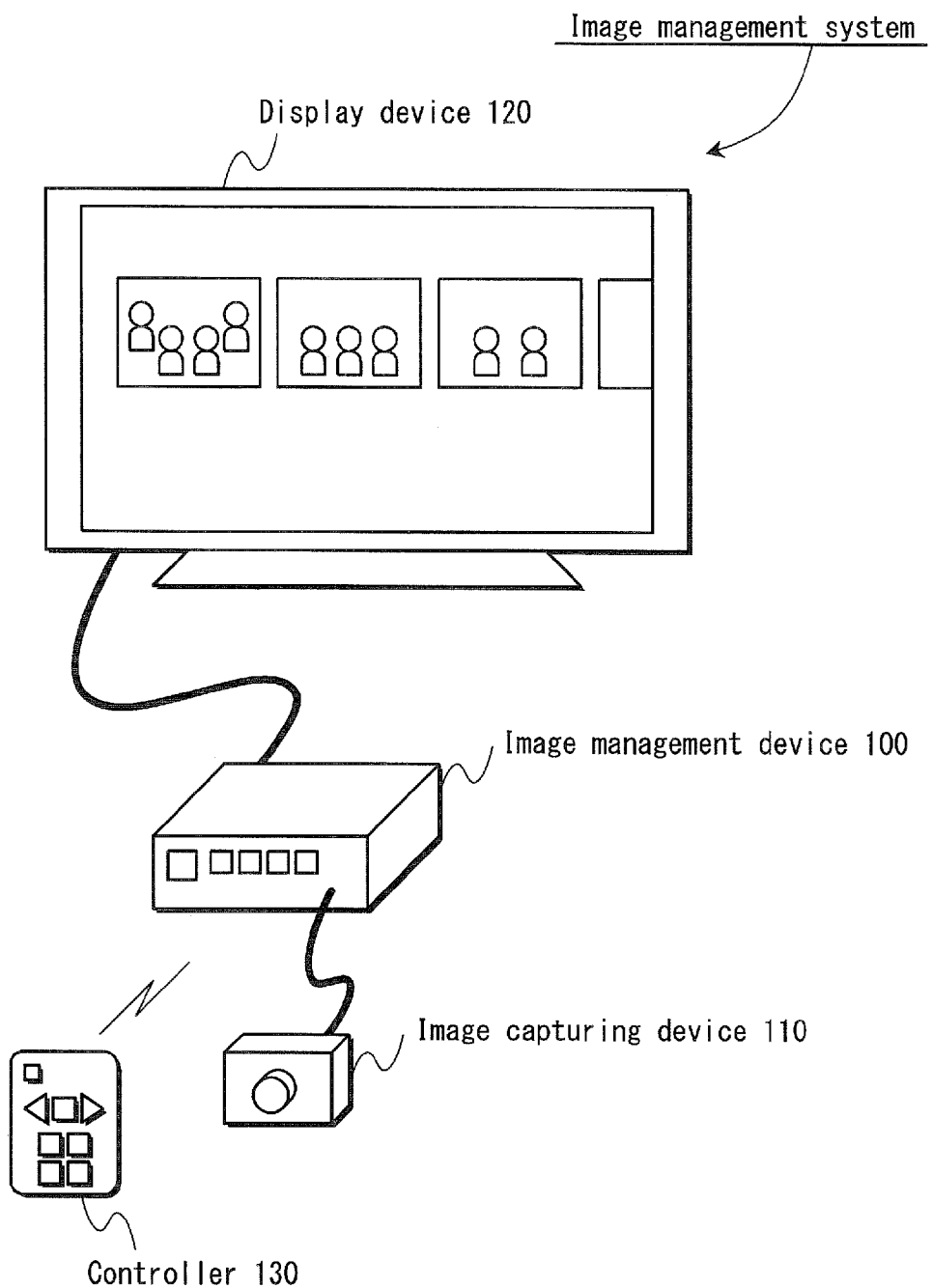
FIG. 1 shows an example of an image management system 10 composed of an image management device 100 and devices related to the image management device 100.

FIG. 1 shows an example of an image management system 10 composed of the image management device 100 and devices related to the image management device 100.

The image management device 100 is connected to an image capturing device 110 and a display device 120. The image management device 100 operates by receiving an operation signal from a controller 130.

The image capturing device 110 captures an image, stores the image together with Exif (Exchangeable image file format) information including a shooting date and time, and transmits the image and the Exif information to the image management device 100 via a cable or the like. The image capturing device 110 is, for example, a digital camera.

The display device 120 displays a screen image output from the image management device 100 by being connected to the image management device 100 via a cable or the like. The display device 120 is, for example, a digital television.

The image management device 100 stores images acquired from the image capturing device 110, searches for an image by receiving an operation signal from the controller 130, and outputs a result of the search to the display device 120.

The search is performed with use of an object (i.e., a human face) as a search key. The image management device 100 outputs an image including a human face, which has been judged to be the same as the human face designated as a search key. At this point, even if the feature of the face of the person has changed over time, the image management device 100 is configured to accurately judge the face to be the same as the human face designated as a search key.

<1-1 Structure>

The image management device 100 includes, as hardware, an input terminal for acquiring an image, an output terminal for outputting a screen image, a receiver for receiving an operation signal from the controller 130, a memory for storing therein data and programs, and a processor for executing the programs and controlling the input terminal, the output terminal, and the receiver.

Figure 2:
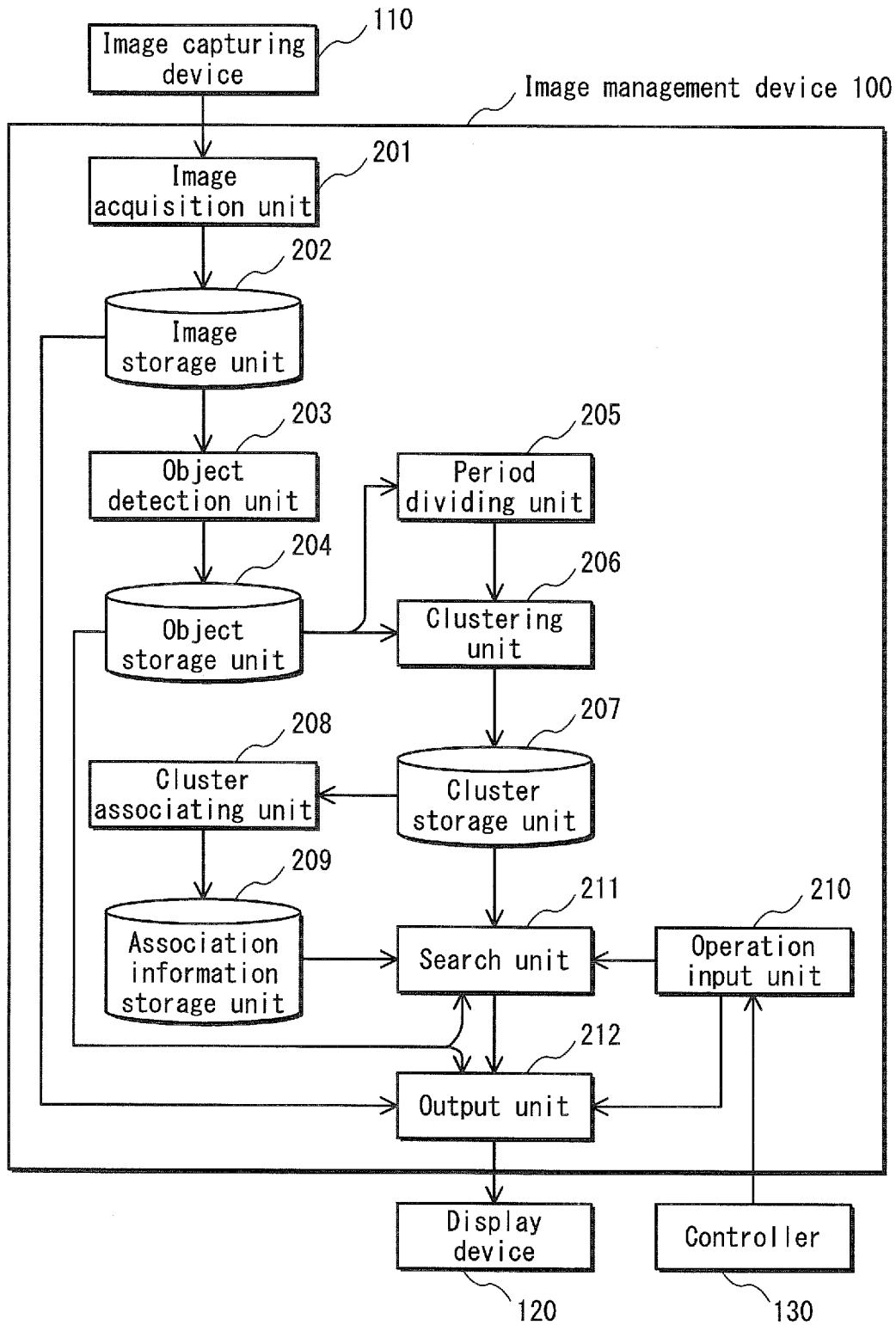
FIG. 2 is a block diagram showing a structure pertaining to the functions of the image management device 100.

FIG. 2 shows the structure of the image management device 100.

As shown in FIG. 2, the image management device 100 includes an image acquisition unit 201, an image storage unit 202, an object detection unit 203, an object storage unit 204, a period division unit 205, a clustering unit 206, a cluster storage unit 207, a cluster associating unit 208, an association information storage unit 209, an operation input unit 210, a search unit 211, and an output unit 212.

The functions of the image acquisition unit 201, the object detection unit 203, the period division unit 205, the clustering unit 206, the cluster associating unit 208, the operation input unit 210, the search unit 211, and the output unit 212 are realized by the processor executing the programs stored in the memory.

The image storage unit 202, the object storage unit 204, the cluster storage unit 207, and the association information storage unit 209 are realized by parts of the memory.

The image acquisition unit 201 acquires a plurality of images from the image capturing device 110 via the input terminal. Each of the images thus acquired is associated with the file name of the image and the shooting date and time at which the image was captured, and is stored in the image storage unit 202. Hereinafter, a group of images stored in the image storage unit 202 is referred to as an image group. In the case where a new image is to be stored in the image storage unit 202 when an image group has already been stored therein, the data of the new image is added to the image group.

FIG. 3 shows the data structure and details of an image group 300 stored in the image storage unit 202.

As shown in FIG. 3, the image group 300 includes a plurality of images, and each image includes a file name, image data, and a shooting date and time. As shown in FIG. 3, an image included in the image group 300 includes a file name 301, image data 302, and a shooting date and time 303.

A file name is a character string for uniquely identifying an image. A file name is given to each image by the image capturing device 110. Suppose that when a new image is to be stored in the image storage unit 202, an image having the same file name as the new image has already been stored in the image storage unit 202. In this case, the image acquisition unit 201 gives a different file name to the new image by, for example, appending a numerical value to the file name of the new image.

Specifically, in the case where a new image having the file name of "aaaa.jpg" is to be added to the image group 300 including an image having the file name 301 of "aaaa.jpg", the new image is stored under the file name of "aaaa1.jpg".

Hereinafter, when a description is provided with an example of a specific image, the image is referred to by use of the corresponding file name that ends with ".jpg". For example, an image having the file name of "aaaa.jpg" is referred to as an image aaaa.jpg.

A shooting date and time at which each image is captured is indicated by Exif information provided for the image by the image capturing device 110. For example, the shooting date and time 303 of "2010:06:13 16:33:56" indicates that the image was captured on Jun. 13, 2010, at 16 hours, 33 minutes, and 56 seconds.

In the example shown in FIG. 3, images from the image aaaa.jpg captured on Jun. 13, 2010, at 16:33:56 to an image xyxy.jpg captured on Aug. 24, 2030, at 15:42:11 are stored as the image group 300.

The object detection unit 203 detects an object from each image stored in the image storage unit 202, and extracts a feature value from the object. Then, the object detection unit 203 stores the feature values thus extracted into the object storage unit 204 as object detection information pieces corresponding one-to-one to the detected objects.

Figure 4:
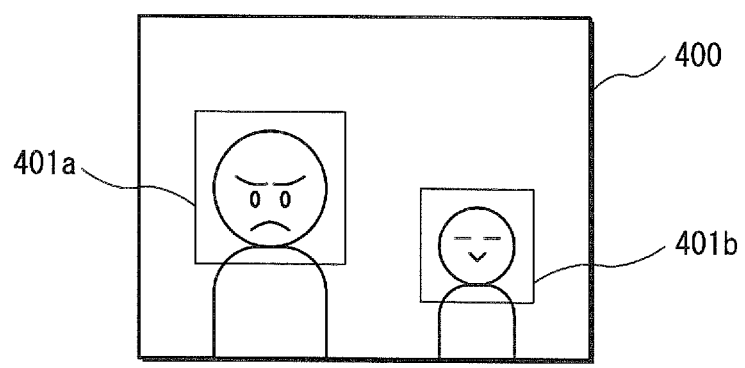
FIG. 4 shows an image of face detection.

A technology for detecting an object is conventionally known. In the present embodiment, an object is detected using the following technology. That is, as shown in FIG. 4, a feature value (not shown) included in each rectangular area (rectangular areas 401a and 401b) in an image 400 is extracted. Then, the feature value thus extracted is compared with a predetermined feature value pattern pertaining to an object.

A feature value indicates a feature pertaining to the distribution of the values of pixels in an image. In the present embodiment, a feature value is represented by a vector (e.g., 800-dimensional vector) constituted of a plurality of numerical values indicating a feature of the image.

Examples of a feature of an image include the frequency, orientation, etc. of the distribution of pixel values included in the image, which are obtained with use of a Gabor filter. Examples of a feature value useful for identifying a human face include the distance between two points recognized as eyes from the feature of the image as described above, the distance between a point recognized as a nose and a point recognized as a mouth, etc.

The object storage unit 204 stores therein, for example, an object detection information table 500 shown in FIG. 5. The object detection information table 500 includes fields for storing a plurality of object detection information pieces. Each object detection information piece is composed of an object ID (Identifier), a file name, a feature value, and date and time at which an image was captured.

In each object detection information piece, the object ID is an identifier for identifying an object; the file name indicates an image from which the object has been detected; the feature value is extracted from the object; and the shooting date and time indicates at what date and time the image from which the object has been detected was generated by image capturing.

Hereinafter, the shooting date and time of an image from which an object has been detected is referred to as the shooting date and time of the object.

As shown in FIG. 5, the object detection information table 500 includes, for example, object detection information pieces each composed of an object ID 501, a file name 502, a feature value 503, and a shooting date and time 504.

Each object ID 501 is a character string starting with "OBJ" followed by a four-digit serial number, which is allocated to each object detected by the object detection unit 203 in order starting from an object detected first.

For example, the object ID of an object detected first by the object detection unit 203 is "OBJ0001", and the object ID of an object detected $1024^{th}$ is "OBJ1024".

Hereinafter, when a description is provided with an example of a specific object, the object is referred to by use of the corresponding object ID. For example, an object identified by the object ID "OBJ0001" is referred to as an object OBJ0001.

In the example of FIG. 5, the object detection information piece in the first line of the object detection information table 500 indicates that the object OBJ0001 having the feature value 503 of "(152, 669, . . . )" has been detected from the image aaaa.jpg captured on Jun. 13, 2010, 16:33:56. Similarly, each of the object detection information pieces in the other lines also includes the object ID of an object, the file name of an image from which the object has been detected, a feature value, and a shooting date and time.

The period division unit 205 divides an overall period including the shooting date and time of each object stored in the object storage unit 204 into a plurality of periods. Then, the period division unit 205 temporarily stores, into a part of the memory, divided period data pieces each indicating a divided period obtained as a result of the division of the overall period. The division by the period division unit 205 is performed such that divided periods that are adjacent on a time axis partially overlap each other.

Figure 6:
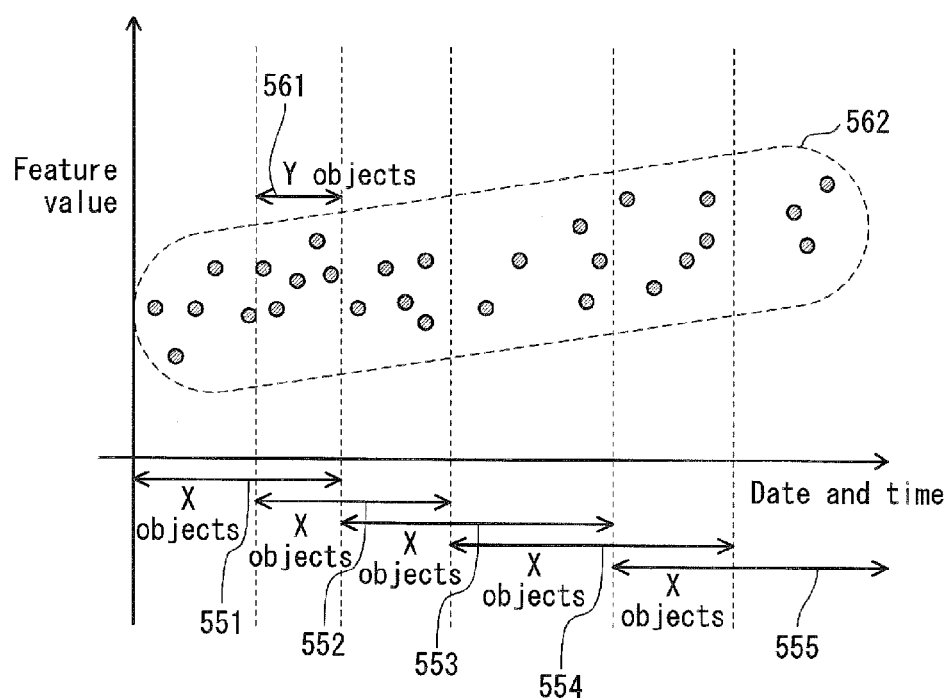
FIG. 6 shows an image of divided periods and the number of objects included in each of the divided periods.

FIG. 6 is an image of division performed by the period division unit 205. In FIG. 6, the horizontal axis represents date and time, and the vertical axis represents the feature value of each object. In FIG. 6, a plurality of points 562 indicate respective objects. Each point 562 is plotted at a position based on the shooting date and time and the feature value indicated by the corresponding object detection information piece.

Note that in FIG. 6, the feature values are depicted one-dimensionally due to limitations of space. However, each of the feature values is actually a vector constituted of a plurality of numerical values, as described above. In the figures mentioned below, a graph using a shooting date and time and a feature value is depicted in the same manner as in FIG. 6.

As shown in FIG. 6, the division is performed such that the total number of objects each corresponding to a shooting date and time in one divided period becomes X (X being a predetermined number), and that the total number of objects each corresponding to a shooting date and time in an overlapping period in which adjacent divided periods overlap each other becomes Y (Y being a predetermined number smaller than X). However, this manner of division does not apply to a divided period including most recent objects.

As shown in FIG. 6, divided periods 551, 552, 553, 554, and 555 are arranged in the stated order, along the horizontal axis representing date and time, from the past to the future. Each of the divided periods 551, 552, 553, and 554 includes X objects. The divided period 555 includes the number of objects smaller than or equal to X. An overlapping period 561, in which the divided period 551 and the divided period 552 overlap each other, includes Y objects.

Hereinafter, when referring to the shooting date and time of an object, the "shooting date and time" is omitted unless it causes confusion. For example, a period including the shooting date and time of an object A is referred to as "the period including an object A". Also, when the shooting date and time of the object A is more recent than a date and time B, it is referred to as "the object A is more recent than the date and time B".

The determination of divided periods is sequentially performed from a divided period including the oldest objects. The division by the period division unit 205 ends when the most recent divided period is generated. Depending on the total number of objects, the number of objects included in the most recent divided period may be less than X.

In the example of FIG. 6, the overall period is divided by X being set to 10 and Y being set to 5. The first divided period, i.e., the oldest divided period, is determined so as to include the $1^{st}$ to $10^{th}$ oldest objects. The second oldest divided period is determined so as to include the $6^{th}$ to $15^{th}$ oldest objects. Here, the $6^{th}$ to $10^{th}$ objects are shared between the first divided period and the second oldest divided period. In this way, five of the objects included in the first divided period, i.e., the $6^{th}$ to $10^{th}$ objects, are also included in the second oldest divided period.

Note that in FIG. 6, an example is given where X is 10 and Y is 5 to simplify the description. However, it is preferable to set the values of X and Y to be sufficiently large for clustering and association processing described below. Hereinafter, a description is provided under the assumption that X is 100 and Y is 50.

FIG. 7 shows an example of a divided period data table 700, and shows the data structure of divided periods and a result of division of the overall period. The divided period data table 700 includes fields for storing a plurality of divided period data pieces. Each divided period data piece is composed of a divided period ID, a starting date and time, and an ending date and time. In each divided period data piece, the divided period ID is an identifier for identifying a divided period; the starting date and time indicates at what date and time the divided period starts, and is shown by year, month, date, hour, minute, and second; and the ending date and time indicates at what date and time the divided period ends, and is shown by year, month, date, hour, minute, and second.

As shown in FIG. 7, the divided period data table 700 includes, for example, divided period information pieces each composed of a divided period ID 701, a starting date and time 702, and an ending date and time 703.

Each divided period ID is a character string with "DP" followed by a three-digit serial number, which is allocated to each divided period obtained by the period division unit 205 dividing the overall period, in order starting from the oldest divided period. Note that an old divided period refers to a divided period whose starting date and time and ending date and time are relatively old. Similarly, a new divided period refers to a divided period whose starting date and time and ending date and time are relatively new (i.e., recent).

For example, the divided period ID identifying the oldest divided period is "DP001", and the divided period ID identifying the $12^{th}$ oldest divided period is "DP012".

Hereinafter, when a description is provided with an example of a specific divided period, the divided period is referred to by use of the divided period ID corresponding thereto. For example, a divided period identified by the divided period ID "DP001" is referred to as a divided period DP001.

The clustering unit 206 performs, for each divided period obtained by the period division unit 205 dividing the overall period, clustering on objects belonging to the divided period with use of the feature values of the respective objects. Subsequently, the clustering unit 206 stores cluster information pieces obtained as a result of the clustering into the cluster storage unit 207.

Figure 8:
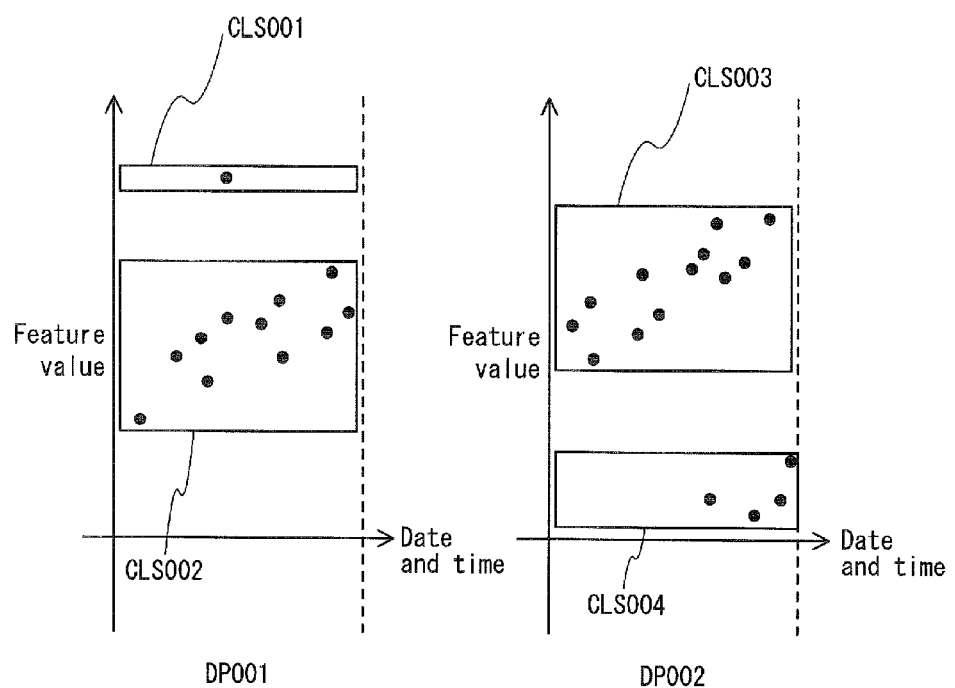
FIG. 8 shows an image of clustering performed in divided periods DP001 and DP002.

FIG. 8 shows an image of clustering performed in the divided periods DP001 and DP002. In FIG. 8, clusters CLS001, CLS002, CLS003, and CLS004 are each indicated by a rectangle, and each black spot indicates an object. For example, the cluster CLS001 includes one object; the cluster CLS002 includes 11 objects; the cluster CLS003 includes 12 objects; and the cluster CLS004 includes four objects. Each object included in one rectangle belongs to the same cluster. Note that in FIG. 8, only some of the objects included in each divided period are shown due to limitations of space.

Clustering of objects is performed with use of the feature values of the objects in K-means method.

According to the K-means method, a representative value is determined, for each of K (predetermined number) clusters, based on the feature values of the respective objects belonging to the cluster. Then, each object is categorized based on a difference between each of the representative values and the feature value of the object. As shown in FIG. 8, objects having similar feature values are categorized into the same cluster by the K-means method. Hereinafter, categorizing each object by determining a representative value of a cluster is referred to as "generating a cluster".

Objects indicating the same photo-subject have similar feature values. Therefore, a cluster to which the objects belong substantially corresponds to the photo-subject. Also, since clustering is performed in each divided period which is shorter than the overall period, the clustering is less susceptible to the change of a human face due to aging.

FIG. 9 shows an example of the data structure of a cluster information table 900.

The cluster information table 900 includes fields for storing a plurality of cluster information pieces. The cluster information pieces correspond one-to-one to clusters generated by the clustering unit 206. Each cluster information piece is composed of a cluster ID, one or more object IDs, and a divided period ID. Each two cluster information pieces included in the cluster information table 900 shares a divided period ID.

Each cluster ID is an identifier for uniquely identifying the corresponding cluster. Each object ID is an identifier for uniquely identifying an object included in the corresponding cluster. Also, each divided period ID is an identifier for uniquely identifying a divided period in which the corresponding cluster has been generated.

The cluster information piece in the first line of the cluster information table 900 includes a cluster ID 901 of "CLS001", an object ID 902 of "OBJ0001, OBJ0002, . . . ", and a divided period ID 903 of "DP0001". The cluster information piece in the second line includes a cluster ID 904 of "CLS0002", and an object ID 905 of "OBJ0025, . . . , OBJ0099, OBJ0100", and the divided period ID 903 of "DP001". In this way, the cluster information pieces in the first and second lines of the cluster information table 900 share the same divided period ID 903 of "DP001".

Here, each cluster ID is a character string starting with "CLS" followed by a three-digit serial number, which is allocated to each cluster generated by the clustering unit 206, in order starting from a cluster first generated.

For example, the cluster ID of a cluster first generated by the clustering unit 206 is "CLS001", and the cluster ID of a cluster generated 8$^{th}$ is "CLS008".

Hereinafter, when a description is provided with an example of a specific cluster, the cluster is referred to by use of the corresponding cluster ID. For example, a cluster identified by the cluster ID of "CLS001" is referred to as a cluster CLS001.

In the example of FIG. 9, the cluster information piece in the first line indicates that a cluster identified by CLS001 includes a plurality of objects such as an object OBJ0001, and that the cluster has been generated in a divided period identified by DP001. Similarly, in the cluster information pieces in the second line onwards, each cluster information piece indicates that a cluster identified by the corresponding cluster ID includes objects identified by the corresponding object IDs, and that the cluster has been generated in a divided period identified by the corresponding divided period ID.

Figure 10:
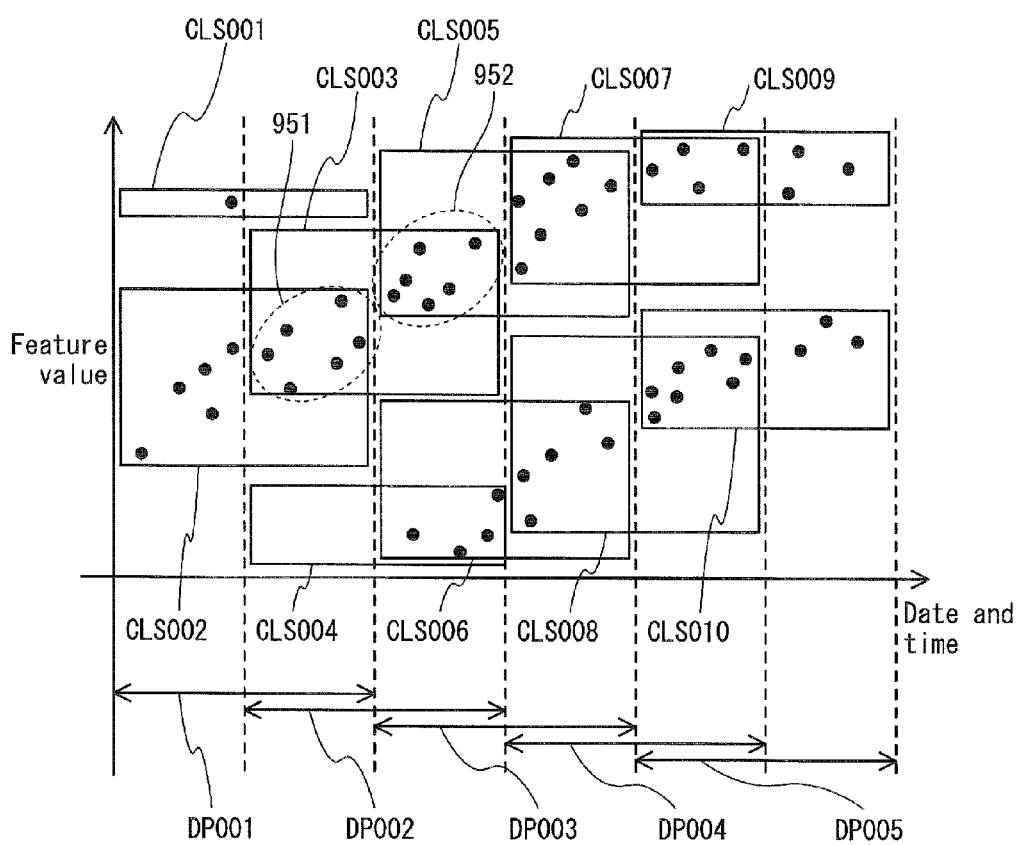
FIG. 10 is a graph showing an example of a result of clustering performed during a period from the divided period DP001 through a divided period DP005.

FIG. 10 is a graph showing an example of a result of clustering performed during a period from the divided period DP001 through a divided period DP005. Similarly to FIG. 6, in FIG. 10, the horizontal axis represents date and time, and the vertical axis represents the feature value of each object. Also, a plurality of points indicate respective objects, and each of the points is plotted at a position based on the shooting date and time and the feature value indicated by the corresponding object detection information piece.

As shown in FIG. 10, the divided periods DP001, DP002, DP003, DP004, and DP005 are arranged in the stated order along the horizontal axis from the past to the future. The divided period DP001 and the divided period DP002 partially overlap each other. Also, the divided period DP002 and the divided period DP003 partially overlap each other. Similarly, the divided period DP003 and the divided period DP004 partially overlap each other, and the divided period DP004 and the divided period DP005 partially overlap each other.

Also, the cluster CLS001 and the cluster CLS002 are generated in the divided period DP001, and the cluster CLS003 and the cluster CLS004 are generated in the divided period DP002. Similarly, in the divided period DP003 onwards, two clusters are generated in each divided period.

The cluster associating unit 208 associates clusters adjacent to each other among the clusters generated in the divided periods identified by the divided period IDs stored in the cluster storage unit 207.

Hereinafter, a description is provided on the assumption that an older one of two adjacent divided periods is a divided period A and a newer one of the two is a divided period B.

The cluster associating unit 208 compares each cluster generated in the divided period A with each cluster generated in the divided period B, and associates clusters including a predetermined number of same objects. In the present embodiment, a description is provided on the assumption that the predetermined number is one.

For example, in the example of the cluster information table 900, each of the cluster CLS 0002 in the divided period DP001 (corresponding to the divided period A) and the cluster CLS003 in the divided period DP002 (corresponding to the divided period B) includes the objects OBJ0099 and OBJ0100. Therefore, the cluster CLS002 is associated with the cluster CLS003.

Since one cluster substantially corresponds to one person, it is highly likely that each object belonging to the two clusters that are associated with each other indicates the same person. Accordingly, each object belonging to the two clusters that are associated with each other is associated with each other as the same person via the association of the two clusters.

Here, in the example shown in FIG. 10, each of the cluster CLS002 and the cluster CLS003 includes six objects 951. Also, each of the cluster CLS003 and the cluster CLS005 includes six objects 952.

Therefore, in the pair of the divided period DP001 and the divided period DP002, the cluster CLS002 and the cluster CLS003 that each include six objects 951 are associated. Also, in the pair of the divided period DP002 and the divided period DP003, the cluster CLS003 and the cluster CLS005 that each include six objects 952 are associated.

A result of association of each divided period and a divided period adjacent thereto is stored, as association information, into an association information table 970 held by the association information storage unit 209.

FIG. 11 shows an example of the association information table 970, and shows the data structure of association information pieces indicating a result of association based on the example of FIG. 10.

The association information table 970 includes fields for storing a plurality of association information pieces. Each association information piece includes a first cluster ID and a second cluster ID. Each pair of the first cluster IDs and the second cluster IDs is a pair of identifiers for identifying two clusters associated with each other as described above.

As shown in FIG. 11, the association information piece in the first line in the association information table 970 is composed of a first cluster ID901a of "CLS002" and a second cluster ID901b of "CLS003", and shows the cluster ID of each of the two clusters that are associated with each other. Note that the left column (associations 1 to 7) of the association information table 970 shown in FIG. 11 is added for convenience, and may be omitted from data indicated by the association information table 970.

Suppose that a cluster a generated in the divided period A is associated with a cluster b generated in the divided period B. In this case, the cluster ID identifying the cluster a is set to the first cluster ID, and the cluster ID identifying the cluster b is set to the second cluster ID. Then, an association information piece composed of the first cluster ID and the second cluster ID is generated, and written into the association information table 970.

In the example of FIG. 11, the following clusters are associated with each other: the cluster CLS002 and the cluster CLS003 (association 1); the cluster CLS003 and the cluster CLS005 (association 2); the cluster CLS004 and the cluster CLS006 (association 3); the cluster CLS005 and the cluster CLS007 (association 4); the cluster CLS006 and the cluster CLS008 (association 5); the cluster CLS007 and the cluster CLS009 (association 6); and the cluster CLS008 and the cluster CLS010 (association 7).

The operation input unit 210 specifies an object selected by the user, based on an operation signal received by the receiver from the controller 130, and causes the search unit 211 to search for an image. Also, the operation input unit 210 causes the output unit 212 to output operation data.

The search unit 211 searches for an object indicating the same person as the person indicated by the object specified by the operation input unit 210, and transmits, to the output unit 212, the file name 301 of the image including the object obtained as a result of the search.

The search of the object is performed with use of the cluster information pieces stored in the cluster storage unit 207 and the association information pieces stored in the association information storage unit 209.

The output unit 212 outputs a screen image to the display device 120, and causes the display device 120 to display the screen image. The screen image output by the output unit 212 comes in two types, i.e., a selection screen for the user to select an object as a search key, and a result screen which shows a result of search by the search unit 211.

Figure 12A:
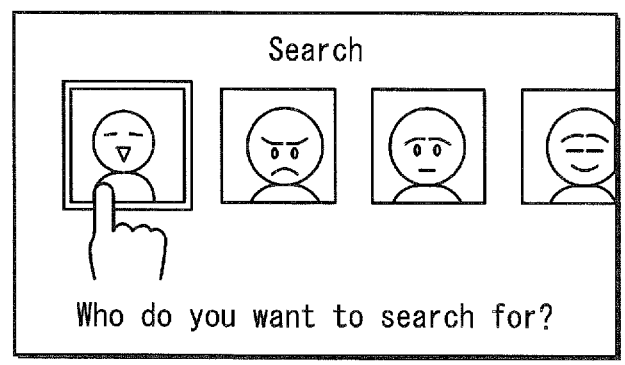
FIGS. 12A and 12B show an example of screens output by an output unit 212.

FIG. 12A shows an example of the selection screen. In the example of FIG. 12A, a plurality of images each indicating an object are arranged in a display area of a selection screen 981, and an image indicating an object currently targeted for selection is surrounded by a double-line frame.

Figure 12B:
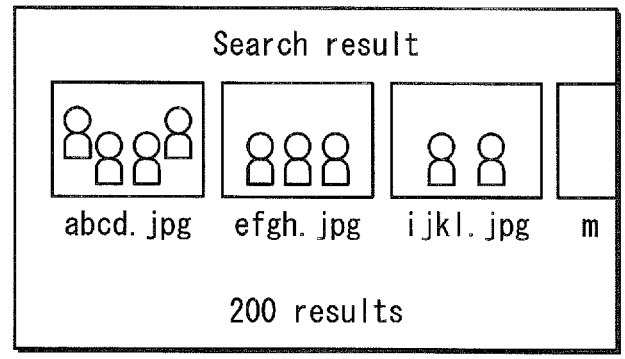

FIG. 12B shows an example of the result screen. In the example shown in FIG. 12B, images obtained as a result of search by the search unit 211 and the file names of the images are shown in pairs in a result screen 982, together with the number of images obtained as the result of search.

<1-2. Operation>

The following describes processing performed by the image management device 100.

Processing performed by the image management device 100 is mainly divided into two types, i.e., image storage processing and search processing.

<1-2-1. Image Storage Processing>

The image storage processing is processing for acquiring images from the image capturing device 110, storing the images, and categorizing objects included in the images thus stored.

The image storage processing is started when the image management device 100 is ready to acquire images stored in the image capturing device 110, in a state where the image capturing device 110 is connected to the image management device 100.

Figure 13:
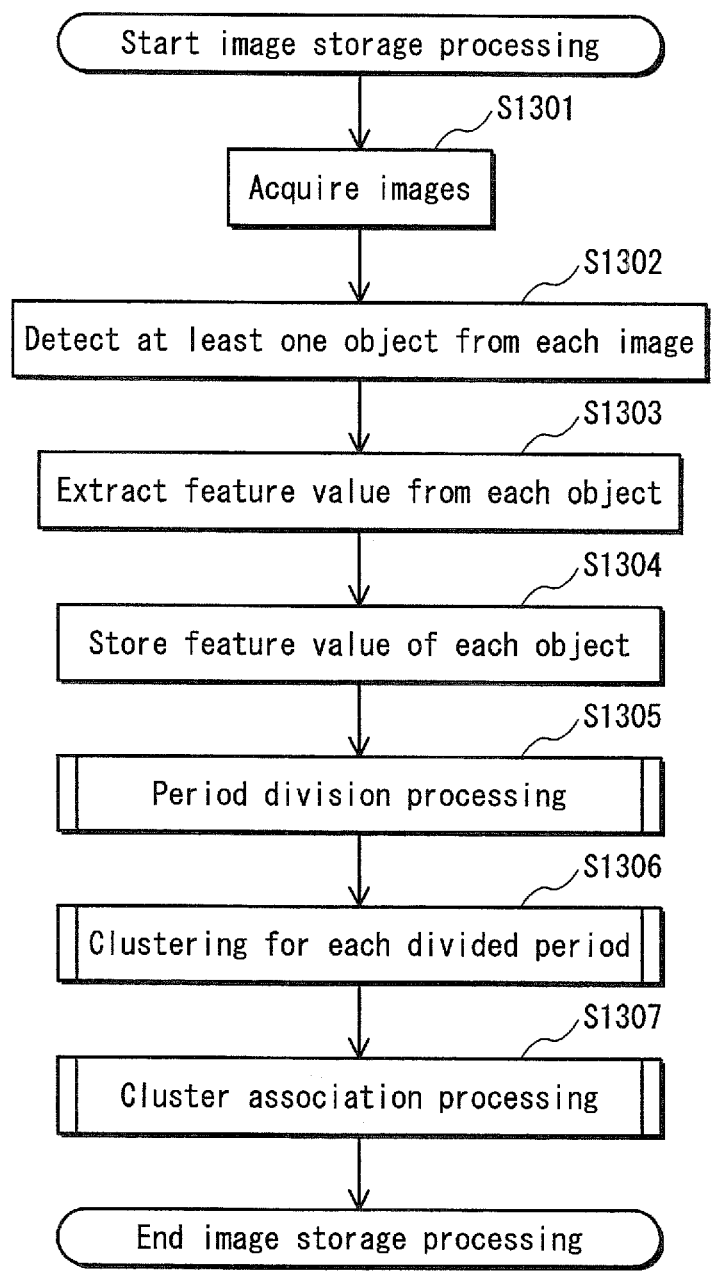
FIG. 13 is a flowchart showing image storage processing.

The following describes the image storage processing with reference to the flowchart shown in FIG. 13.

First, the image acquisition unit 201 acquires a plurality of images from the image capturing device 110 via the input terminal, and stores the images thus acquired into the image storage unit 202 (step S1301).

After the images are stored in the image storage unit 202, the object detection unit 203 detects at least one object from each of the images (step S1302), and extracts a feature value from each of the objects thus detected (step S1303). Subsequently, the object detection unit 203 provides an object ID for each object, and stores an object detection information piece of each object into the object storage unit 204, the object detection information piece including the object ID of the object, the file name of an image from which the object was detected, a feature value extracted from the object, and the shooting date and time of the image (step S1304).

Next, the period dividing unit 205 performs period division processing for dividing the overall period into a plurality of periods (hereinafter, "divided periods") (step S1305).

The clustering unit 206 performs clustering for each divided period, with use of a result of the period division processing (step S1306).

Then, the cluster associating unit 208 performs cluster association processing for associating clusters generated in the clustering performed for each divided period (step S1307).

The following describes in detail each of the period division processing, the clustering for each divided period, and the cluster association processing.

<1-2-2. Period Division Processing>

Period division processing is processing for dividing the overall period to determine divided periods, and generating divided period data pieces. With this processing, the divided periods are determined such that the number of objects included in each divided period is X, and the number of objects included in each overlapping period is Y.

Figure 14:
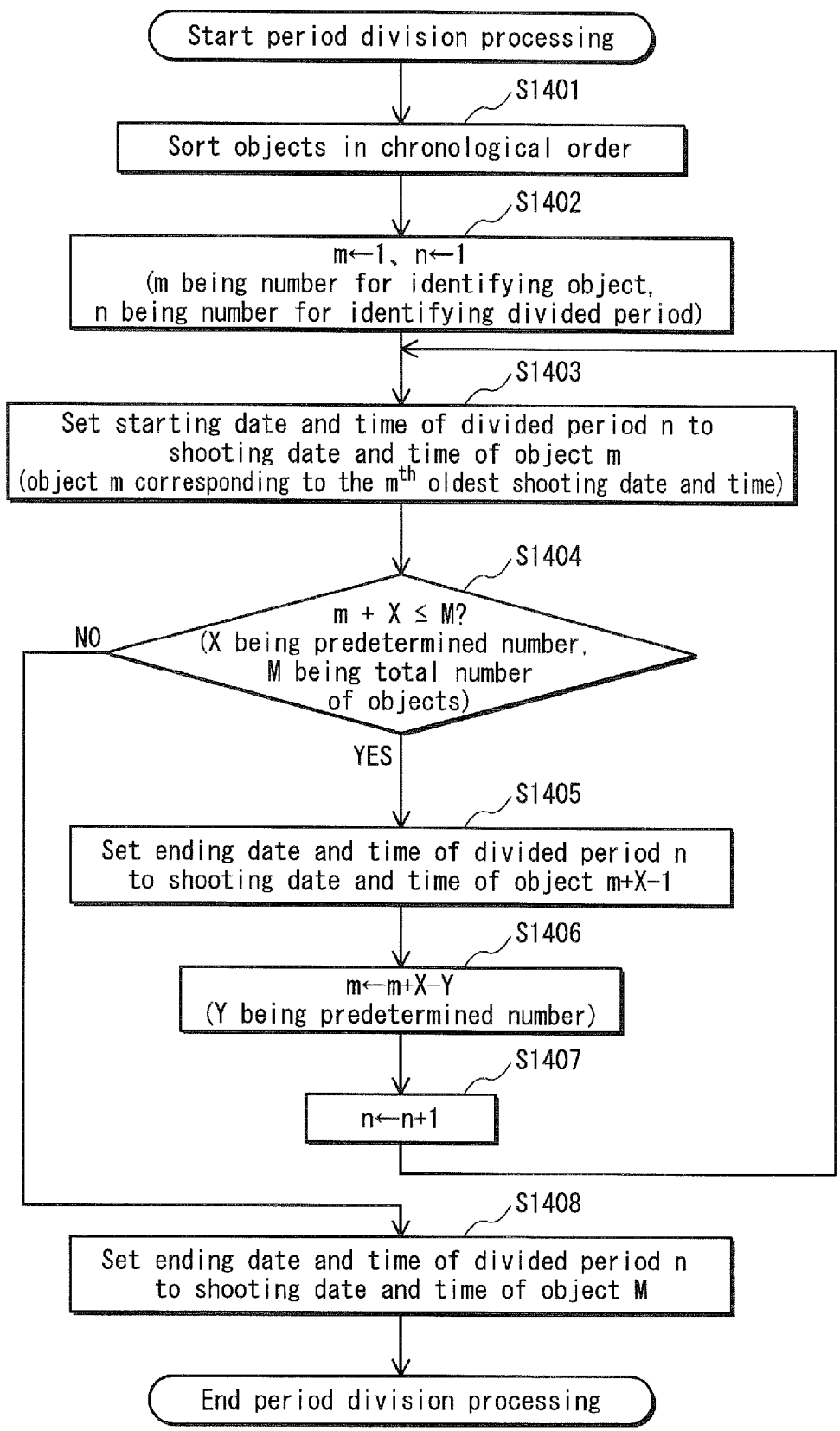
FIG. 14 is a flowchart showing period division processing.

The following describes the period division processing with reference to the flowchart shown in FIG. 14.

First, the period dividing unit 205 sorts all objects, based on the object detection information pieces stored in the object storage unit 204, such that the objects are aligned in chronological order starting from the object corresponding to the oldest shooting date and time (step S1401).

Next, the period dividing unit 205 initializes each of a variable m and a variable n to "1" (step S1402).

Here, the variable m is a number for identifying each object in the period division processing. An object identified by the variable m is an object corresponding to the $m^{th}$ oldest shooting date and time. Hereinafter, an object identified by the variable m is denoted by an object m.

Also, the variable n is a number for identifying each divided period in the period division processing. A divided period identified by the variable n is the $n^{th}$ oldest divided period. Hereinafter, a divided period identified by the variable n is denoted by a divided period n.

The period dividing unit 205 sets the starting date and time of the divided period n to the shooting date and time of the object m (step S1403). Since the starting date and time of the divided period n is set to coincide with the shooting date and time of the object m, the object m is the oldest object among objects included in the divided period n.

Next, the period dividing unit 205 judges whether m+X is less than or equal to M, where M denotes the total number of objects (step S1404). In other words, the judgment is made as to whether an object m+X exists.

Here, the object m+X is an $(X+1)^{th}$ object counting from the object m. For example, suppose that m=1001, and X=100. In this case, the object m+X, i.e., an object 1101 is the $101^{th}$ object counting from an object 1001, and the $100^{th}$ object is an object 1100.

Since the object m is the oldest object among the objects included in the divided period n, the object m+X is the oldest object among the objects newer than the ending date and time of the divided period n.

In other words, judging whether the object m+X exists in step S1404 is equivalent to judging whether an object exists whose shooting date and time is newer than the ending date and time of the divided period n.

If m+X≤M (step S1404: YES), the period dividing unit 205 sets the ending date and time of the divided period n to the shooting date and time of an object m+X−1 (step S1405).

In this way, the divided period n including X objects is determined, where the X objects are aligned from the object m in chronological order.

Upon determining the divided period n, the period dividing unit 205 provides a divided period ID for the divided period n thus determined, and generates divided period data (not shown).

Subsequently, the period dividing unit 205 sets the variable m to m+X−Y in order to specify an object used to determine the starting date and time of a next divided period n+1 (step S1406).

Here, an object m+X−Y is the $Y^{th}$ object from an object m+X−1, i.e., the most recent object included in the divided period n in reverse chronological order.

For example, suppose that m=1001, n=11, X=100, and Y=50. In this case, a divided period 11 includes objects 1001 to 1101. Accordingly, a divided period 12 is determined by setting the starting date and time of the divided period 12 to the shooting date and time of the object 1051, so that the overlapping period between the divided period 11 and the divided period 12 includes 50 objects from the object 1051 to the object 1100.

Then, in order to determine the next divided period, the period dividing unit 205 increments the variable n by "1" (step S1407) and returns to step S1403.

If m+X>M in the judgment of step S1404 (step S1404: NO), the period dividing unit 205 determines the divided period n by setting the ending date and time of the divided period n to the shooting date and time of the object M (step S1408).

Then, the period dividing unit 205 provides a divided period ID 701 for the divided period n thus determined, and ends the period division processing.

<1-2-3. Clustering for Each Divided Time Period>

Clustering for each divided period is processing for categorizing objects included in each divided period into clusters.

Figure 15:
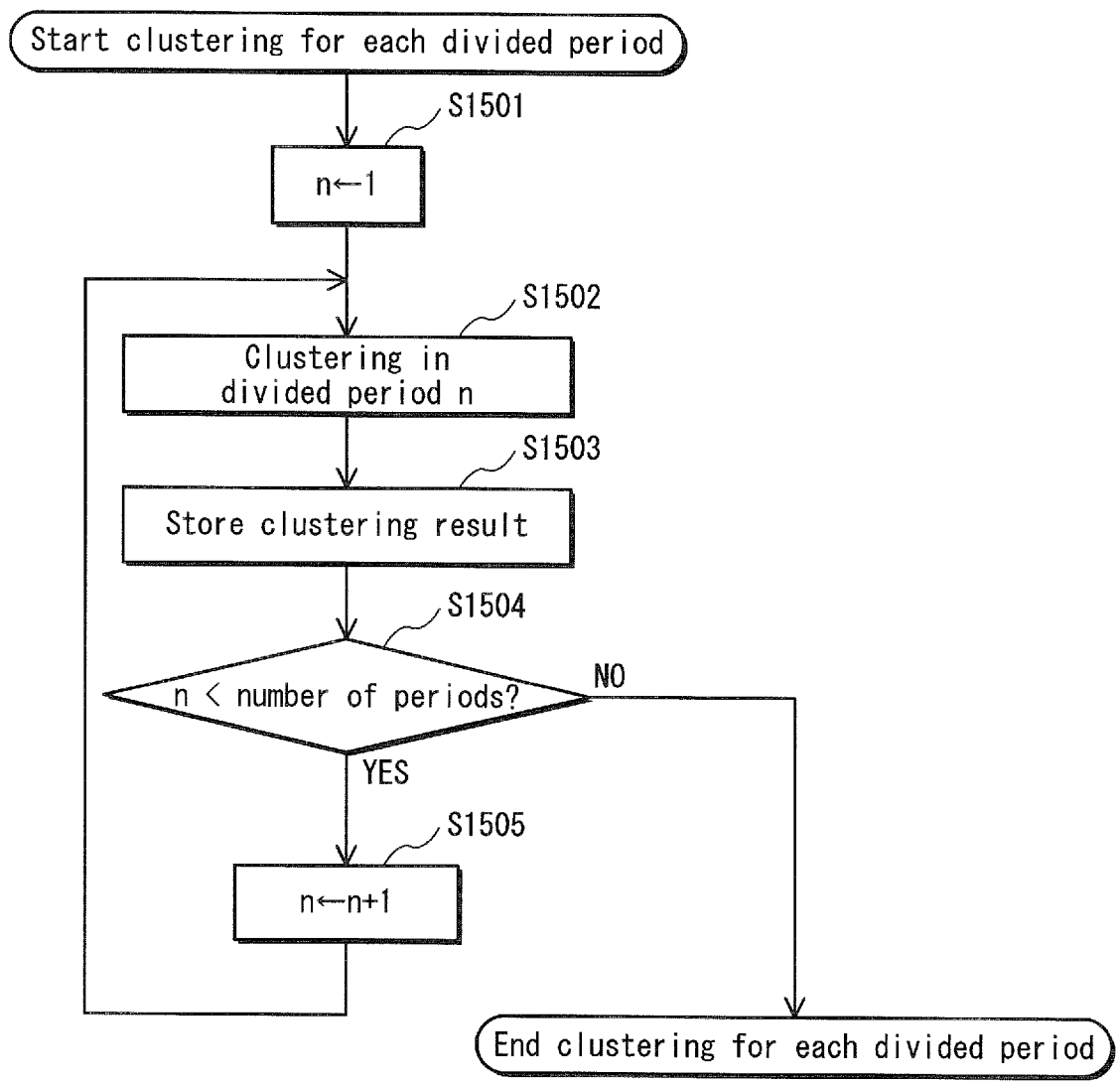
FIG. 15 is a flowchart showing clustering performed in each divided period.

The following describes the clustering for each divided period with reference to the flowchart shown in FIG. 15.

The clustering unit 206 initializes the variable n to "1" (step S1501). Here, the variable n is a number for identifying each divided period in the clustering performed for each divided period. For example, a divided period 7 is the $7^{th}$ oldest divided period, i.e., DP007.

The clustering unit 206 performs clustering on objects included in the divided period n (step S1502). At this point, the clustering unit 206 generates a cluster ID for each of the clusters thus generated.

Subsequently, the clustering unit 206 stores a result of the clustering into the cluster storage unit 207 (step S1503).

In other words, the clustering unit 206 generates, for each of the clusters thus generated in the clustering, a cluster information piece composed of the cluster ID of the cluster, the object ID of each object included in the cluster, and the divided period ID of the divided period n, and stores the cluster information piece thus generated into the cluster storage unit 207.

Then, the clustering unit 206 judges whether the variable n is less than the number of divided periods (step S1504).

If the variable n is less than the number of divided periods (step S1504: YES), the clustering unit 206 increments the variable n by "1" so as to perform clustering in the next divided period (step S1505), and returns to step S1502.

If the variable n is not less than the number of divided periods (step S1504: NO), the clustering unit 206 ends the clustering for each divided period, since clustering is completed in every single divided period.

<1-2-4. Cluster Association Processing>

The cluster association processing is processing for comparing clusters generated in adjacent divided periods, and associating the clusters with each other.

Figure 16:
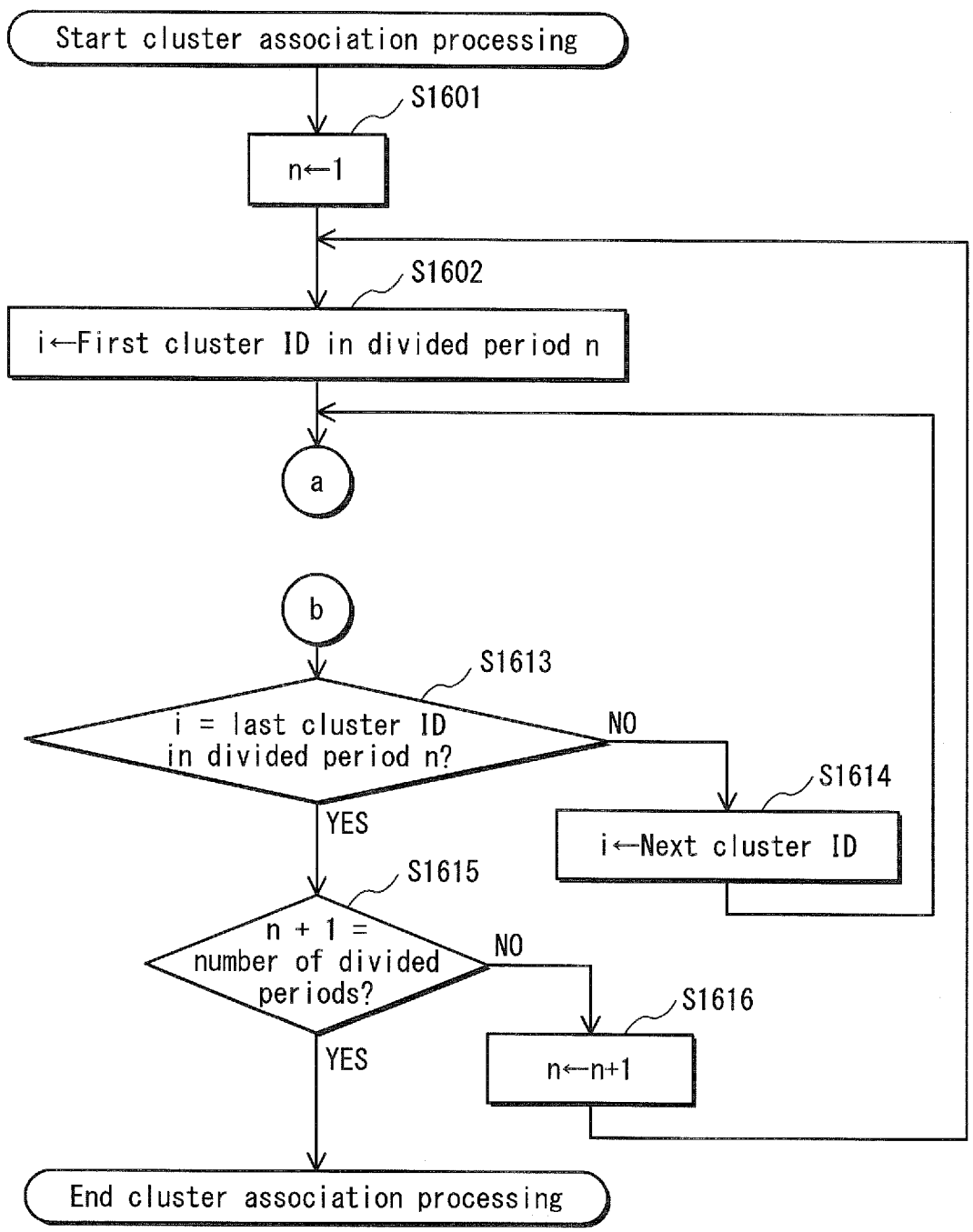
FIG. 16 is a flowchart showing cluster association processing.
Figure 17:
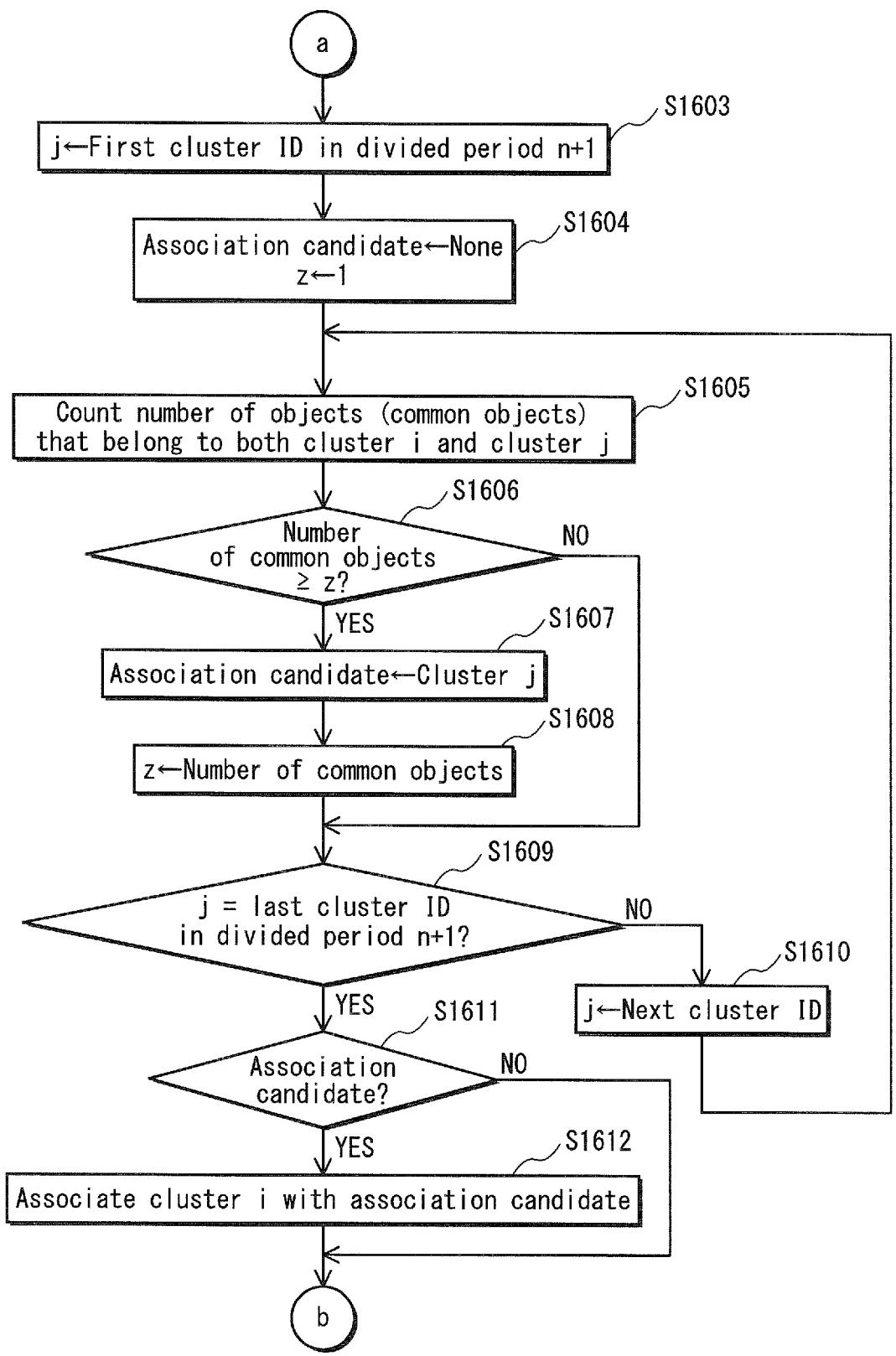
FIG. 17 is a flowchart showing a part of the cluster association processing.

The following describes the cluster association processing with reference to the flowcharts shown in FIGS. 16 and 17.

The cluster associating unit 208 initializes a number n for identifying each divided period to "1" in the cluster association processing (step S1601).

Although not shown in FIGS. 16 and 17, if an association information piece is stored in the association information storage unit 209, the cluster associating unit 208 deletes the association information piece.

The cluster associating unit 208 sets the variable i to the cluster ID of the first cluster in the divided period n (step S1602).

Here, the first cluster in the divided period n is assumed to be the cluster corresponding to a cluster information piece that is generated in the divided period n among the cluster information pieces stored in the cluster storage unit 207, and that includes the cluster ID whose number subsequent to CLS is the smallest in the divided period n.

The cluster associating unit 208 sets a variable j (cluster ID 901) to the cluster ID of the first cluster in the divided period n+1 (step S1603).

The cluster associating unit 208 sets the number of association candidates for a cluster i, which are candidates for association with the cluster i, to "none", and sets a threshold z for performing the association processing to a predetermined number ("1" in the present embodiment) (step S1604).

Here, the cluster i is identified by the cluster ID having the value of the variable i. The same applies to the cluster j.

The cluster associating unit 208 counts the number of common objects, which are objects that belong to both the cluster i and the cluster j (step S1605).

The cluster associating unit 208 judges whether the number of common objects is higher than or equal to the threshold z (step S1606).

If the number of objects is higher than or equal to the threshold z (step S1606: YES), the cluster associating unit 208 sets the cluster j to be an association candidate for the cluster i (step S1607). Here, if an association candidate for the cluster i already exists, the association candidate is replaced with the cluster j.

The cluster associating unit 208 updates the threshold z to the number of common objects (step S1608).

If the number of common objects is lower than the threshold z (step S1606: NO), steps S1607 and S1608 are not performed.

Then, the cluster associating unit 208 judges whether the variable j is the cluster ID of the last cluster in the divided period n+1 (step S1609).

If the variable j is not the ID of the last cluster (step S1609: NO), the cluster associating unit 208 sets the variable j to the cluster ID of the cluster subsequent to the cluster j in the divided period n+1 (step S1610), and returns to step S1605.

If the variable j is the ID of the last cluster (step S1609: YES), the cluster associating unit 208 judges whether an association candidate for the cluster i exists (step S1611).

If an association candidate exists (step S1611: YES), the cluster associating unit 208 associates the cluster i with the association candidate (step S1612).

In other words, the cluster associating unit 208 generates an association information piece in which the first cluster ID is of the cluster i, and the second cluster ID is of the association candidate, and stores the association information piece into the association information storage unit 209. If an association information piece is already stored in the association information storage unit 209, the cluster associating unit 208 adds the association information piece thus generated to the already stored association information piece.

If an association candidate does not exist (step S1611: NO), step S1612 is not performed.

The cluster associating unit 208 judges whether the variable i is the cluster ID of the last cluster in the divided period n (step S1613).

If the variable i is not the ID of the last cluster (step S1613: NO), the cluster associating unit 208 sets the variable i to the cluster ID of the cluster subsequent to the cluster i in the divided period n (step S1614), and returns to step S1603.

If the variable i is the ID of the last cluster (step S1613: YES), the cluster associating unit 208 performs the following processing since the association processing in the divided periods n and n+1 is completed.

The cluster associating unit 208 judges whether the divided period n+1 coincides with the number of divided periods (step S1615).

If the divided period n+1 does not coincide with the number of divided periods (step S1615: NO), the cluster associating unit 208 increments the variable n by "1" (step S1616), and returns to step S1602.

If the divided period n+1 coincides with the number of divided periods (step S1615: YES), the cluster associating unit 108 ends the cluster association processing since association processing in each pair of adjacent periods is completed.

<1-2-5. Search Processing>

Search processing is processing for searching for images with use of an object selected by a user as a search key.

The search processing is started by a user operation in which the user selects a specific object.

Figure 18:
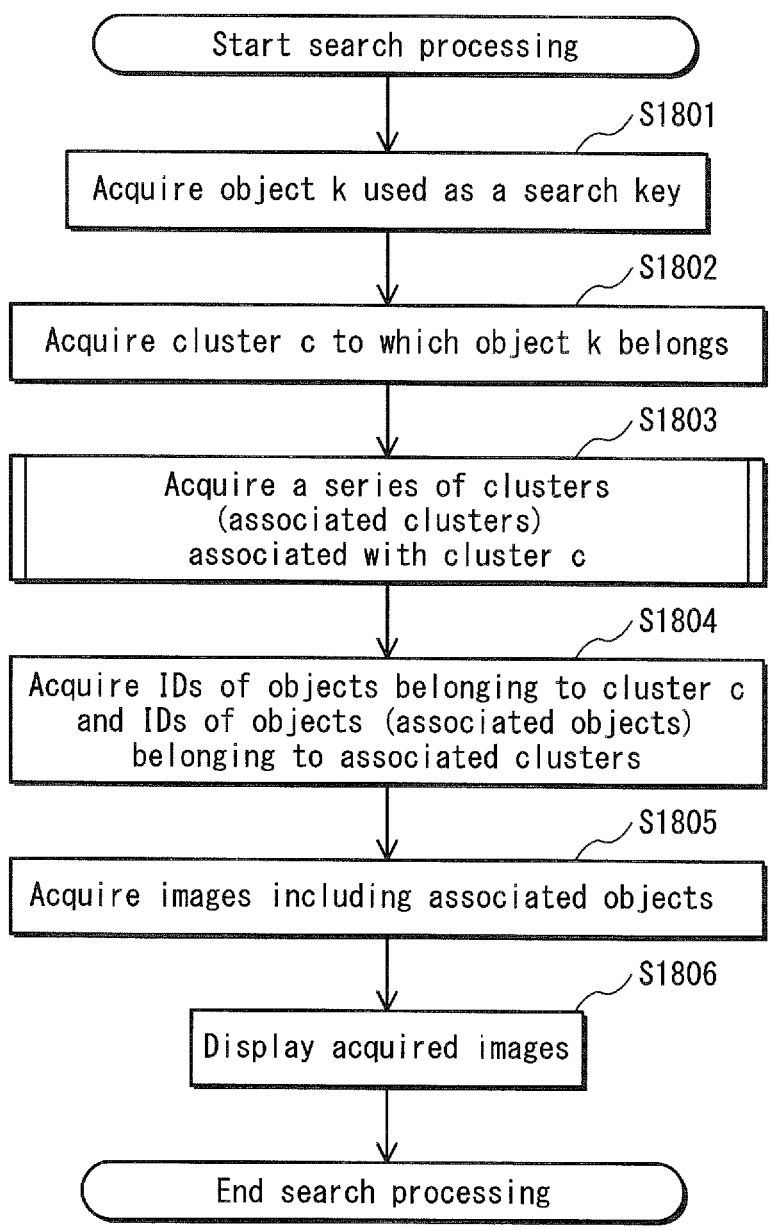
FIG. 18 is a flowchart showing search processing.

The following describes the search processing with reference to the flowchart shown in FIG. 18.

The search unit 211 acquires, from the operation input unit 210, the object ID for identifying an object k which is an object used as a search key (step S1801).

The search unit 211 acquires, from the cluster storage unit 207, the cluster ID for identifying the cluster c to which the object k belongs (step S1802).

The search unit 211 acquires cluster IDs for identifying a series of clusters that are directly or indirectly associated with the cluster c (step S1803). Hereinafter, a series of clusters associated with a certain cluster are referred to as "associated clusters", and the cluster IDs for identifying the associated clusters are referred to as "associated cluster IDs".

For example, suppose that association has been performed as shown in FIG. 11. In this case, there are four associated clusters of the cluster CLS005, i.e., the clusters CLS003 and CLS007 which are associated with the cluster CLS005, the cluster CLS002 which is associated with the cluster CLS003, and the cluster CLS009 which is associated with the cluster CLS007. These clusters CLS003, CLS007, CLS002, and CLS009 are directly or indirectly associated with the cluster CLS005. Therefore, it is highly likely that these clusters CLS003, CLS007, CLS002, and CLS009 indicate the same person.

The details of the processing in step S1803 (i.e., associated cluster acquisition processing for the cluster c) are provided below.

The search unit 211 acquires, from the cluster storage unit 207, the object IDs of objects belonging to the cluster c and the object IDs of objects (hereinafter, "associated objects") belonging to associated clusters (step S1804).

The search unit 211 acquires the file names of images including the associated objects from the object storage unit 204 (step S1805).

The output unit 212 acquires, from the image storage unit 202, the images corresponding to the file names acquired by the search unit 211, and outputs the images in the form of the result screen to the display device 120 (step S1806).

<1-2-6. Associated Cluster Acquisition Processing for Cluster C>

The associated cluster acquisition processing for the cluster c is processing for acquiring the IDs of the associated clusters of the cluster c, with use of association information pieces stored in the association information storage unit 209.

Figure 19:
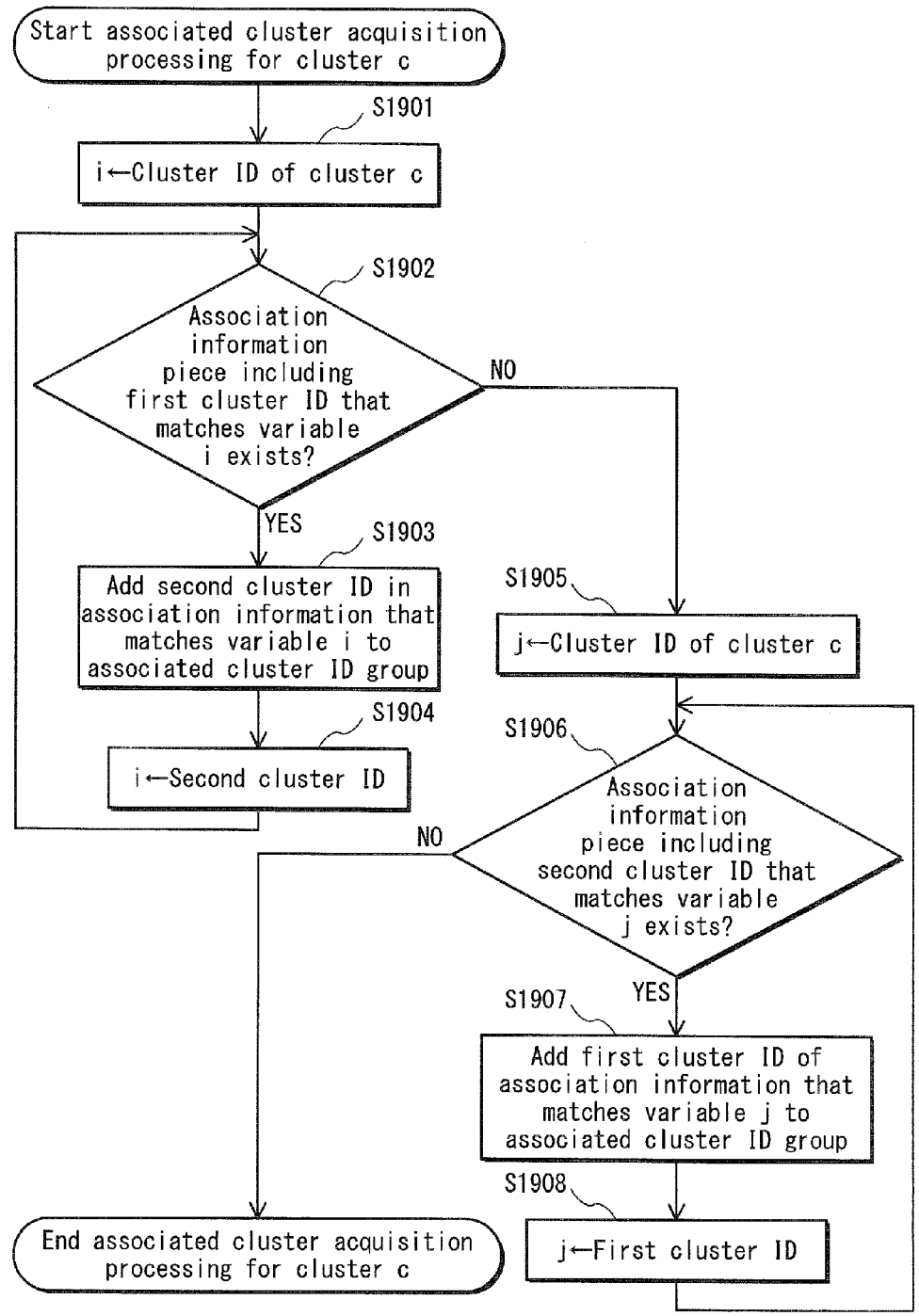
FIG. 19 is a flowchart showing associated cluster acquisition processing for a cluster c.

The following describes the associated cluster acquisition processing for the cluster c, with reference to the flowchart shown in FIG. 19.

The search unit 211 sets the variable i to the cluster ID of the cluster c (step S1901).

Next, the search unit 211 judges whether an association information piece including the first cluster ID that matches the variable i exists in the association information storage unit 209 (step S1902).

If it is judged that such an association information piece exists (step S1902: YES), a cluster corresponding to the second cluster ID included in the association information piece is directly or indirectly associated with the cluster c. Therefore, the search unit 211 adds the second cluster ID to an associated cluster ID group (step S1903).

Subsequently, the search unit 211 sets the variable i to the second cluster ID added in step S1903 (step S1904), and returns to step S1902.

If it is judged that such an association information piece does not exist (step S1902: NO), the search unit 211 sets the variable j to the cluster ID of the cluster c (step S1905).

Next, the search unit 211 judges whether an association information piece including the second cluster ID that matches the variable j exists in the association information storage unit 209 (step S1906).

If it is judged that such an association information piece exists (step S1906: YES), the search unit 211 adds the first cluster ID included in the association information piece to the associated cluster ID group (step S1907).

Subsequently, the search unit 211 sets the variable j to the first cluster ID added in step S1907 (step S1908), and returns to step S1906.

If it is judged that such an association information piece does not exist in step S1906 (step S1906: NO), the search unit 211 ends the associated cluster acquisition processing for cluster c.

2. Embodiment 2

In Embodiment 1, a description has been provided of the image management device 100 that, in order to associate clusters, divides the overall period in a plurality of divided periods such that the number of objects included in each of the divided periods and the number of objects included in each of the overlapping periods are fixed.

In Embodiment 2, a description is provided of an image management device 100a that divides the overall period such that the length of each divided period and the length of each overlapping period are fixed, instead of dividing the overall period as described in Embodiment 1 above.

The image management device 100a has the same structure as the image management device 100. The following mainly describes a difference from the image management device 100.

Figure 20:
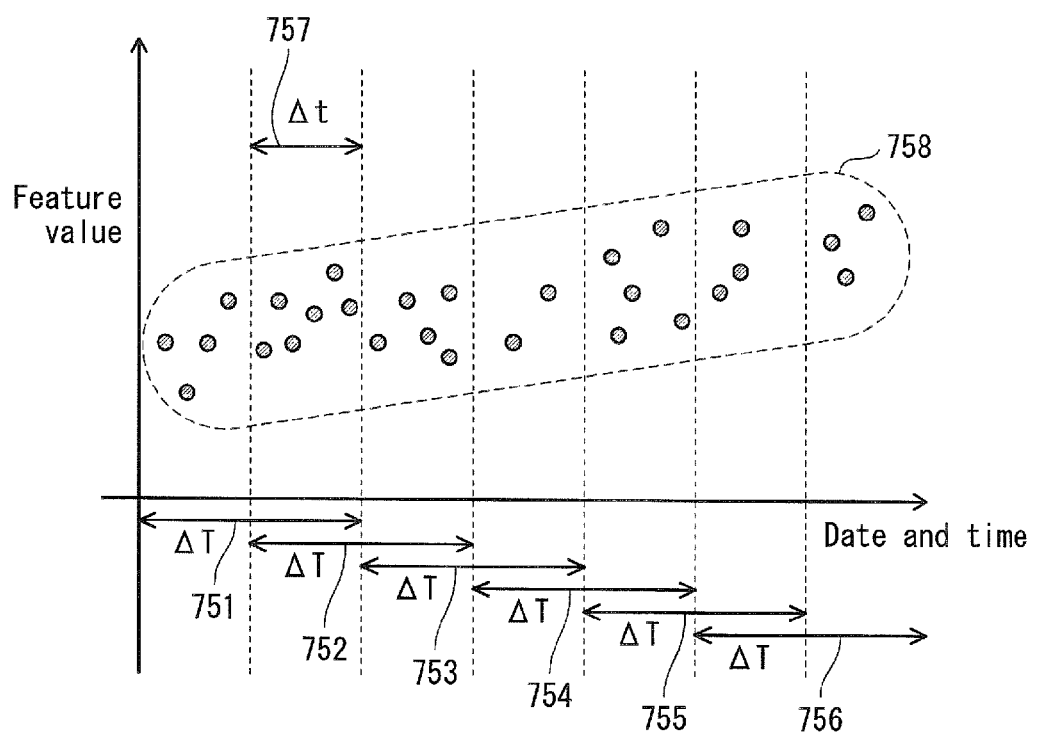
FIG. 20 shows an image of divided periods according to Embodiment 2 and the length of each of the divided periods.

FIG. 20 is an image of division performed by the time period division unit 205 in the image management device 100a. In FIG. 20, the horizontal axis represents date and time, and the vertical axis represents the feature value of each object, similarly to FIG. 6. In FIG. 20, a plurality of points 758 indicate respective objects. Each point 758 is plotted at a position based on the date and time and the feature value indicated by the corresponding object detection information piece.

As shown in FIG. 20, the division by the time period division unit 205 is performed, for example, in a manner that the length of each divided period is $\Delta T$ ($\Delta T$ being a predetermined length, such as one year), and the length of each overlapping period is $\Delta t$ ($\Delta t$ being a length shorter than $\Delta T$, such as a half year). However, the length of the most recent divided period may be shorter than $\Delta T$.

Note that in the present embodiment, a description is provided on the assumption that each divided period includes a sufficient number of objects.

Figure 21:
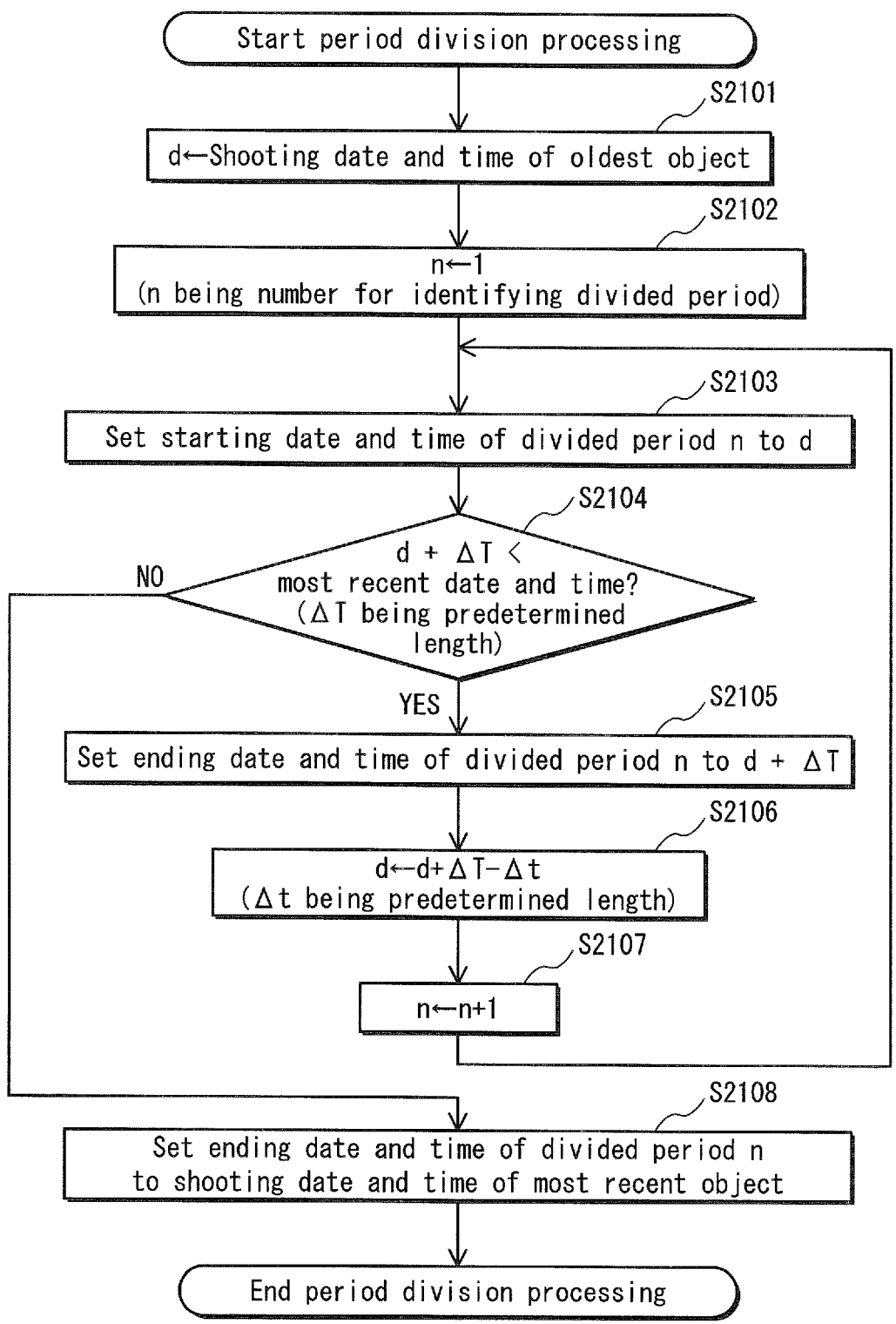
FIG. 21 is a flowchart showing period division processing.

The following describes the period division processing with reference to the flowchart shown in FIG. 21.

The period dividing unit 205 sets a date and time d, which is a variable, to the shooting date and time of the oldest object (step S2101).

Next, the period dividing unit 205 initializes the variable n to "1" (step S2102).

Here, the variable n is a number for identifying each divided period in the period division processing. A divided period identified by the variable n is the $n^{th}$ oldest divided period. In the present embodiment, a divided period identified by the variable n is denoted by a divided period n.

The period dividing unit 205 sets the starting date and time of the divided period n to the date and time d (step S2103).

Next, the period dividing unit 205 judges whether the date and time more recent than the date and time d by $\Delta T$ is older than the shooting date and time of the most recent object (step S2104).

In the description below and FIG. 21, the date and time more recent than the date and time d by $\Delta T$ is denoted by $d+\Delta T$, and the date and time older than the date and time d by $\Delta T$ is denoted by $d-\Delta T$.

If the date and time $d+\Delta T$ is older than the shooting date and time of the most recent object (step S2104: YES), the period dividing unit 205 sets the ending date and time of the divided period n to the date and time $d+\Delta T$ (step S2105).

In this way, the divided period n starting from the date and time d and having the length of $\Delta T$ is determined.

Upon determining the divided period n, the period dividing unit 205 provides a divided period ID for the divided period n thus determined, and generates divided period data (not shown).

Subsequently, the period dividing unit 205 sets the date and time d to $d+\Delta T-\Delta t$, in order to determine the starting date and time of the next divided period n+1 (step S2106).

Then, in order to determine the next divided period, the period dividing unit 205 increments the variable n by "1" (step S2107) and returns to step S2103.

If the date and time $d+\Delta T$ is not older than the shooting date and time of the most recent object in step S2104 (step S2104: NO), the period dividing unit 205 sets the ending date and time of the divided period n to the shooting date and time of the most recent object (step S2108), and determines the divided period n.

Then, the period dividing unit 205 provides a divided period ID for the divided period n thus determined, and ends the period division processing.

3. Embodiment 3

In Embodiment 2, the division of the overall period by the period dividing unit 205 is performed such that the length of each divided period and the length of each overlapping period are fixed.

In Embodiment 3, a description is provided of an image management device 100b that changes the length of a divided period according to the age of a specific person when dividing the overall period, in order to accurately search for the person.

Note that in the present embodiment, a description is provided on the assumption that each divided period includes a sufficient number of objects, similarly to Embodiment 2.

Figure 22:
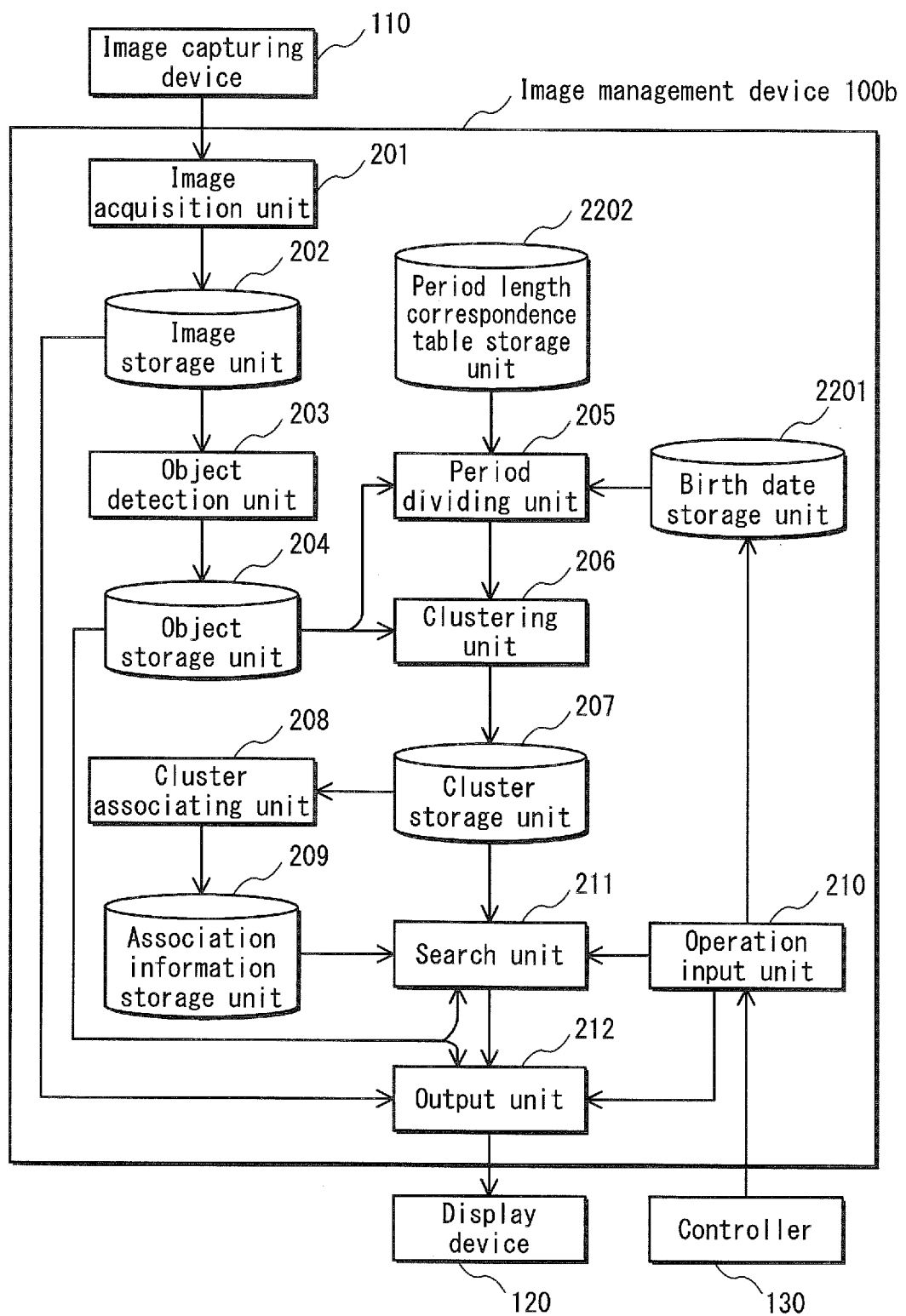
FIG. 22 is a block diagram showing a structure pertaining to the functions of an image management device 100b according to Embodiment 3.

FIG. 22 shows a structure pertaining to the functions of the image management device 100b.

As shown in FIG. 22, the image management device 100b includes a birth date storage unit 2201 and a period length correspondence table storage unit 2202, in addition to the structural elements of the image management device 100a. Also, the operation input unit 210 and the period dividing unit 205 of the image management device 100b are different from those of the image management device 100a. The following mainly describes the differences.

The birth date storage unit 2201 includes a memory area for storing the birth date of a target person. Here, the birth date is indicated by month, date, and year. For example, if the target person was born on Jun. 18, 2010, at 21:05, the birth date of the person is indicated by Jun. 18, 2010.

As shown in the example of FIG. 23, the period length correspondence table storage unit 2202 holds a period length correspondence table 2300. The period length correspondence table 2300 includes fields for storing a plurality of pairs of age ranges and period lengths. Each age range indicates a range of the age of the target person. Also, each period length indicates the length of a divided period.

In the example of FIG. 23, the period length correspondence table 2300 includes an age range 2301 of "0-3 years old" and a period length 2302 of "1 month". This means that the age range "0-3 years old" is associated with a divided period of "1 month". In the period length correspondence table 2300, the age range "4-6 years old" is associated with a period length of "2 months" in the same manner. Also, each age range from 7 years old onwards is associated with a respective period length.

The operation input unit 210 includes a function of receiving the birth date of a target person from the user and storing the birth date into the birth date storage unit 2201, in addition to the function of the operation input unit 210 of the image management device 100a.

The period dividing unit 205 changes the length of each divided period according to the age of the target person at the starting date and time of the divided period, instead of setting the length of each divided period to a fixed length. Note that dates and times before the birth date are not targeted for the division of the overall period.

Figure 24:
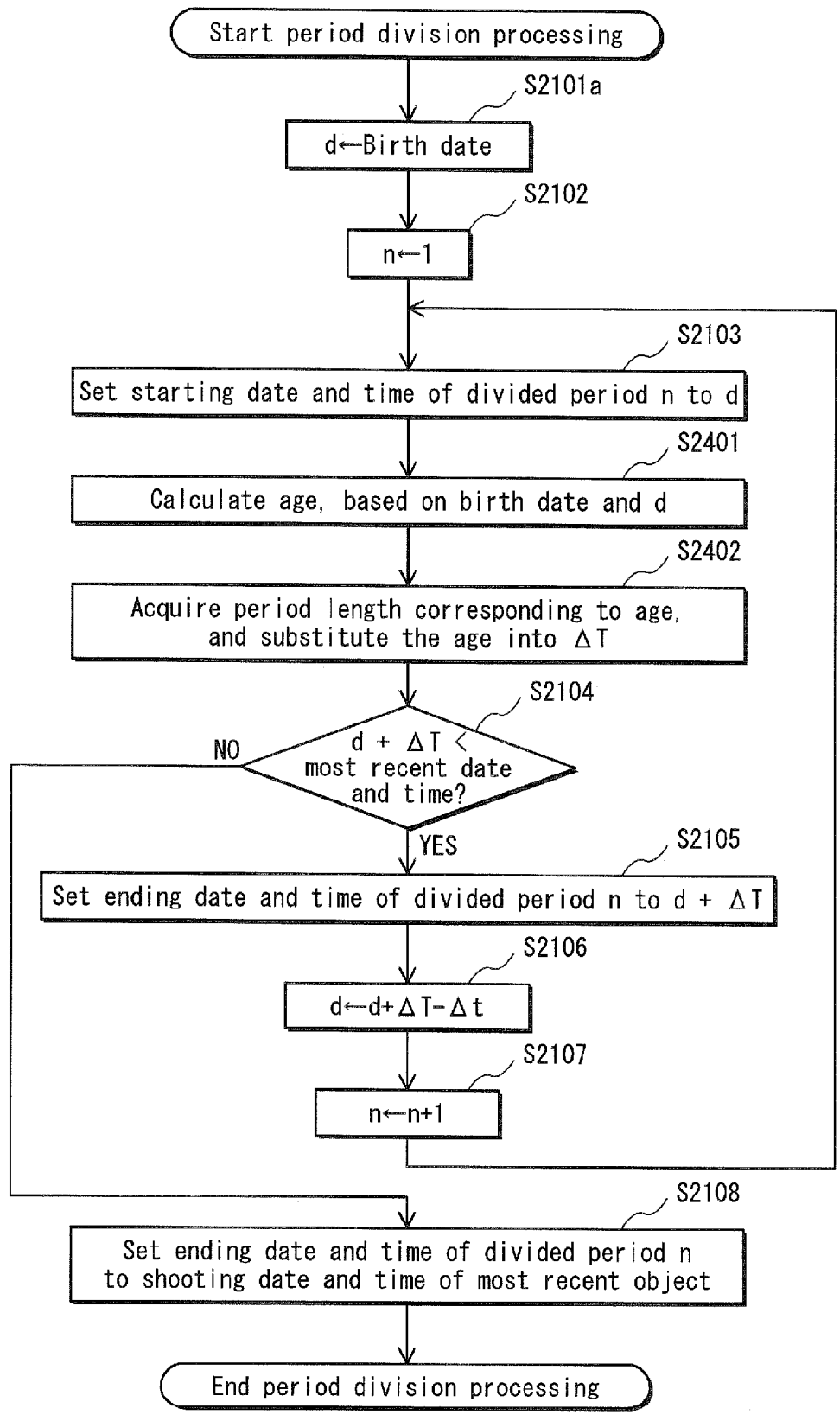
FIG. 24 is a flowchart showing period division processing according to Embodiment 3.

The following describes the operation of the period dividing unit 205 according to Embodiment 3, with reference to the flowchart of FIG. 24. The description is focused on the differences from the flowchart of FIG. 21.

Instead of step S2101 shown in FIG. 21, the period dividing unit 205 acquires the birth date of a target person from the birth date storage unit 2201, and sets the date and time d to the birth date of the target person (step S2101a).

Here, the date and time d is data that includes time (hour, minute, and second) within a day. The hour, minute, and second indicated by the date and time d are set to 0 hours, 0 minutes, and 0 seconds, respectively.

Next, after step S2103 shown in FIG. 21, the period dividing unit 205 calculates the age of the target person at the starting date and time of the divided period n, based on the birth date of the target person and the date and time d (step S2401).

Furthermore, after step S2401, the period dividing unit 205 acquires a period length corresponding to the age of the target person, with reference to the period length correspondence table 2300, and sets ΔT to the period length thus acquired (step S2402).

Next, the period dividing unit 205 performs step S2104 shown in FIG. 21.

The rest of the processing steps are the same as those in the flowchart of FIG. 21. Therefore, a description thereof is omitted.

4. Embodiment 4

The following describes an object associating device 100c according to another embodiment of the present invention.

Figure 26:
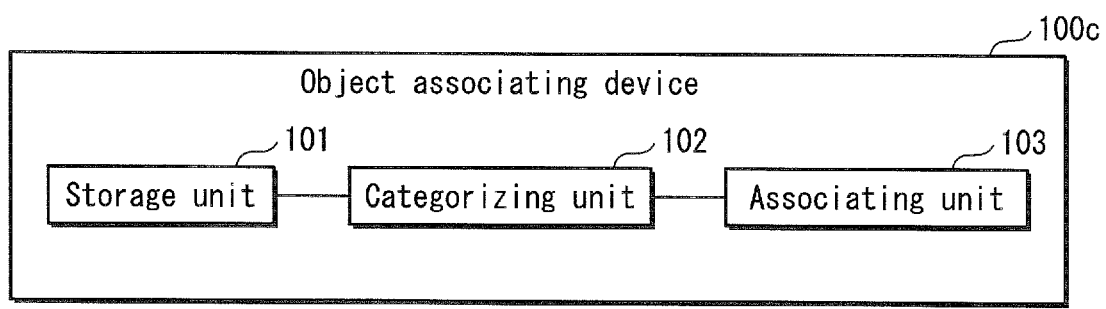
FIG. 26 is a block diagram showing the structure of an object associating device 100c according to Embodiment 4.

(1) As shown in FIG. 26, the object associating device 100c includes a storage unit 101, a categorizing unit 102, and an associating unit 103.

The storage unit 101 stores therein a plurality of contents and a plurality of generation time information pieces in one-to-one correspondence, each generation time information piece indicating time at which the corresponding content was generated.

The categorizing unit 102 categorizes objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other.

The associating unit 103 associates, when a number of objects belonging to both the first group and the second group is greater than or equal to a predetermined number, the objects belonging to the first group with the objects belonging to the second group as objects indicating a same entity.

(2) The contents may be images.

The object associating device 100c further comprises an extracting unit 104 (not shown) configured to detect an object included in each of the images, and extract a feature value of each of the objects thus detected.

The categorizing unit 102 categorizes the objects with use of the feature value of each of the objects.

(3) The object associating device 100c may further comprise a determination unit 105 (not shown) configured to determine the first period and the second period, such that (i) a total number of objects is a fixed number greater than or equal to one in an overlapping period in which the first period and the second period partially overlap each other, the objects being included in images corresponding to generation time information pieces each indicating time within the overlapping period, (ii) the total number of objects is greater than the fixed number in the first period, the objects being included in images corresponding to generation time information pieces each indicating time within the first period, and (iii) the total number of objects is greater than the fixed number in the second period, the objects being included in images corresponding to generation time information pieces each indicating time within the second period.

(4) The objects may be human faces.

The extracting unit 104 may detect the objects by specifying the human faces according to a criterion for human face detection, and extracts the feature value of each of the human faces thus detected.

(5) The object associating device 100c may further comprise a determination unit 105a (not shown) configured to determine the first period and the second period, such that (i) an overlapping period in which the first period and the second period partially overlap each other coincides with a predetermined length and (ii) each of the first period and the second period is longer than the predetermined length.

(6) The objects may be human faces.

The determination unit 105a calculates an age of a person in each of the first period and the second period, and determines a length of each of the first period and the second period based on the age thus calculated.

(7) Each of the generation time information pieces may include a date.

The object associating device 100c further comprises: a date storage unit 106 (not shown) storing therein a reference date for calculation of the age of the person in each of the first period and the second period; and a period length storage unit 107 (not shown) storing therein a plurality of ages and a plurality of lengths of periods in one-to-one correspondence.

The determination unit 105a calculates the age based on the reference date, and determines the length of each of the first period and the second period to be a length corresponding to the age thus calculated with reference to the ages and the lengths of periods that are stored in the period length storage unit.

(8) The object associating device 100c may further comprise a determination unit 105b (not shown) configured to determine the first period and the second period, such that (i) a total number of images is a fixed number greater than or equal to one in an overlapping period in which the first period and the second period partially overlap each other, the images corresponding to generation time information pieces each indicating time within the overlapping period, (ii) the total number of images is greater than the fixed number in the first period, the images corresponding to generation time information pieces each indicating time within the first period, and (iii) the total number of images is greater than the fixed number in the second period, the images corresponding to generation time information pieces each indicating time within the second period.

(9) The object associating device 100c may further comprise a dividing unit 108 (not shown) configured to divide a period into a plurality of sub-periods such that adjacent sub-periods on a time axis partially overlap each other.

The categorizing unit 102 performs categorization with respect to each of the sub-periods.

The associating unit 103 associates each pair of the adjacent sub-periods on the time axis by setting a preceding one of the pair as the first period and a subsequent one of the pair as the second period.

5. Modification

Although the present invention has been described based on the above embodiments, it is not limited to such. For example, the following modifications are included in the present invention.

(1) According to Embodiments 1 to 3, a result of the association processing is used for a search for images. However, the use of the result of the association processing is not limited to such. For example, the result of the association processing may be used for the following purposes.

(a) Evaluate images with use of the number of objects associated as the same person among objects included in the images.

(b) Provide the same metadata for all images including the face of the same person. For example, the metadata may be the name of the person.

(c) Categorize images according to a person included in each of the images.

(2) According to Embodiments 1 to 3, the objects are human faces. However, the objects may be something other than human faces.

For example, the objects may be something whose feature gradually changes over time, such as animals, plants, towns and streets. In this case, the method for detecting objects and extracting feature values, which is performed by the object detection unit 203, may be changed to a method for detecting objects indicating entities (i.e., targets) and extracting feature values with which the entities can be identified.

Also, in the case of associating people with each other, it is possible to detect the bodies of the people as objects instead of the faces thereof, extract the feature values indicating physiques or the like, and use the feature values for the association processing.

(3) According to Embodiments 1 to 3, the contents are still images. However, the contents are not limited to still images, as long as objects indicating entities are detectable from the contents, and feature values are extractable from the objects thus detected.

For example, the contents may be video. In this case, an object can be extracted from each frame of the video, a thumbnail of the video, etc.

Also, the contents may be audio. In this case, for example, objects may be the voices of people, and MFCC (Mel-Frequency Cepstral Coefficients) may be used as the feature values of the voices.

(4) According to Embodiments 1 to 3, the cluster associating unit 208 outputs association information indicating clusters which are associated with each other (in the above embodiment, the cluster associating unit 208 stores the association information in the association information storage unit 209), since objects belonging to the associated clusters are associated with each other. However, it is not limited to such. The cluster associating unit 208 may output information different from the association information as long as the information directly or indirectly indicates the association between objects. For example, it is possible to output data as shown below.

(a) It is possible to perform processing for acquiring a series of associated clusters for each cluster (step S1803 in FIG. 18), and output the cluster IDs of the associated clusters thus acquired for each cluster.

(b) It is possible to perform processing for acquiring associated objects for each cluster (step S1804 in FIG. 18) based on a result of the processing (a), and output the object IDs of the associated objects thus acquired for each cluster.

(c) It is possible to output the results of the processing (a) and the processing (b), after excluding overlapping data. For example, objects belonging to a pair of a cluster A and an associated cluster B, which is a cluster associated with the cluster A, are the same as objects belonging to a pair of a cluster B and an associated cluster A, which is a cluster associated with the cluster B. Therefore, either data corresponding to the pair of the cluster A and the associated cluster B or data corresponding to the pair of the cluster B and the associated cluster A may be output.

(d) In the case of outputting a series of associated clusters as described in (a) above, it is possible to modify a part of the cluster association processing shown in FIG. 16 so as to create an associated cluster ID group list 2500 listing the IDs of the associated clusters.

As shown in FIG. 25, the associated cluster ID group list 2500 includes fields for storing a plurality of associated cluster group information pieces. Each associated cluster group information piece is composed of a cluster group ID and an associated cluster ID group. Each cluster group ID is an identifier for uniquely identifying the corresponding associated cluster group information piece. Each associated cluster ID group includes one or more associated cluster IDs.

As shown by an example of FIG. 25, the associated cluster ID group list 2500 includes three associated cluster group information pieces. The associated cluster group information piece in the first line of the associated cluster ID group list 2500 includes a cluster group ID 2502 and an associated cluster ID group 2501. The associated cluster group information piece in the second line includes a cluster group ID 2504 and an associated cluster ID group 2503. The associated cluster group information piece in the third line includes a cluster group ID 2506 and an associated cluster ID group 2505.

To create the associated cluster ID group list 2500 listing a plurality of associated cluster group information pieces as shown in FIG. 25, the processing shown in the flowchart of FIG. 16 may be modified as follows.

First, the following processing steps (d-1) to (d-3) are added after step S1602.

(d-1) Judge whether an associated cluster ID group including the same associated cluster ID as the value of the variable i exists in any of the associated cluster group information pieces in the associated cluster ID group list 2500.

(d-2) If such an associated cluster ID group exists, the processing proceeds to step S1603. If such an associated cluster ID group does not exist, a cluster group ID is generated. The generation of the cluster group ID is performed, for example, by connecting a character string "CS" to a three-digit serial number. In the associated cluster ID group list 2500 shown in FIG. 25, cluster group IDs 2502, 2504, and 2506 are "CS001", "CS002", and "CS003", respectively. Each of the cluster group IDs is generated by connecting the character string "CS" to a different one of serial numbers "001", "002", and "003".

(d-3) After generating the cluster group ID, generate an associated cluster ID group including the variable i as an element, generate an associated cluster group information piece composed of the cluster group ID and the associated cluster ID group thus generated, and additionally write the associated cluster group information piece into the associated cluster ID group list 2500. Next, the processing proceeds to step S1603.

Then, in step S1612, instead of associating the cluster i with the association candidate, add the cluster ID of the association candidate to the associated cluster ID group including the cluster i.

(5) According to Embodiments 1 to 3, extraction of feature values is performed with use of the Gabor filter. However, it is possible to employ a different method as long as the method enables extraction of a value indicating a feature of an object.

For example, it is possible to extract a SIFT (Scale-Invariant Feature Transform) feature.

(6) According to Embodiments 1 to 3, the shooting date and time is data indicating up to the second. However, the shooting date and time does not always need to indicate up to the second as long as it indicates time at which an image was generated.

For example, the shooting date and time may be data indicating month, date, and year. Alternatively, it may be data indicating only month and year if the length of divided periods and the length of an overlapping period are sufficiently long.

Also, it does not always need to be data acquired from the Exif information. For example, the shooting date and time may be indicated with use of the date and time at which the file was created.

(7) According to Embodiments 1-3, the method for acquiring images may be freely changed as long as images and shooting dates and times of the images are associated and stored into the image storage unit 202.

For example, images may be acquired via a memory card, a network, or the like. Alternatively, images may be acquired from the image capturing device 110 wirelessly without use of cables.

Also, instead of acquiring images from an external device, the image management device itself may generate images. For example, the image management device may include an imaging device or the like, generate images with use of the imaging element, and store the images into the image storage unit 202.

(8) According to Embodiment 1, the description is provided with the example where X and Y are set such that Y=X/2 (X=10, Y=5; and X=100, Y=50). However, Y<X/2 and Y>X/2 are acceptable as long as $1 \leq Y < X$.

Similarly, according to Embodiment 2, the example is given where $\Delta t = \Delta T/2$ ($\Delta T=1$ year; and $\Delta t=$ half year). However, $\Delta T$ and $\Delta t$ may be changed as long as the relationship of $\Delta t < \Delta T$ is satisfied.

(9) According to Embodiments 1 to 3, the clustering unit 206 performs clustering by means of the K-means method. However, a method other than the K-means method may be employed as long as each set of similar objects is categorized into a group. For example, it is possible to employ Ward's method.

Also, in Embodiment 1, the algorithm for clustering may be changed according to the length of each divided period. For example, in the longest divided period, the range of each feature value judged to belong to the same cluster (same person) may be increased.

(10) According to Embodiments 1 to 3, descriptions are provided of the period division processing based on various criteria. However, the period division processing may be performed based on a criterion different from the criteria mentioned above as long as the overall period is divided such that adjacent divided periods partially overlap each other.

For example, according to the period division processing in Embodiment 1, the division is performed such that each of (i) the number of objects included in each divided period and (ii) the number of objects included in an overlapping period is a predetermined number. However, the division may be performed with use of the number of images instead of the number of objects. Specifically, the division may be performed such that the number of images included in each of the periods is a predetermined number.

Also, the division may be performed such that each of the number of objects included in each divided period and the number of objects included in an overlapping period is a predetermined number, and that the length of each of the divided periods and the length of the overlapping period is greater than or equal to a predetermined length. For example, in the period division processing according to Embodiments 2 and 3, if the number of objects included in either a divided period or an overlapping period is small or zero, the divided period and the overlapping period may be lengthened.

(11) According to Embodiments 1 to 3, a predetermined number of same objects for associating two clusters is one (i.e., the association is performed if each of the two clusters includes one same object). However, the predetermined number may be greater than or equal to two.

In the case where the predetermined number is one, judgment of whether to associate two clusters is made based on whether an object included in both of the two clusters exists.

In the case where the predetermined number is greater than or equal to two, the association between two clusters is performed when an object included in both of the two clusters exists and the number of objects included in both of the two clusters is greater than or equal to the predetermined number.

(12) According to Embodiments 1 to 3, the clustering unit 206 performs clustering with use of the feature values of objects. However, it is acceptable to perform clustering with use of another parameter in addition to the feature values. For example, clustering may be performed with use of the shooting dates and times of objects in addition to the feature values thereof.

(13) According to the cluster association processing in Embodiments 1 to 3, the judgment of step S1606 is made as to whether the following condition is satisfied: the number of common objects is higher than or equal to the threshold z. However, the judgment may be made as to whether the number of common objects is higher than the threshold z. In this case, the judgment is equivalent to judgment as to whether the number of common objects is greater than or equal to z+1.

Also, the number of conditions used for the judgment may be increased. Examples of such conditions include the sharpness of an image, the proportion of the area of an object to the area of an image including the object, etc.

(14) According to Embodiments 1 to 3, the temporal property of each of the clusters and the associated clusters may be specified from a result of clustering in each divided period and a result of association processing. Then, the temporal properties thus specified may be used to improve the accuracy of clustering in each divided period.

(15) According to Embodiment 3, the period length correspondence table 2300 in FIG. 23 is used to calculate a period length for each age range. However, the period length correspondence table 2300 in FIG. 23 does not always need to be used to calculate the period length 2302 according to age.

For example, it is possible to use a period length correspondence table showing a plurality of pairs of age ranges and period lengths which are different from those shown in the period length correspondence table 2300 in FIG. 23. Alternatively, it is possible to use a function in which a variable is set to age, instead of using the period length correspondence table 2300.

(16) According to the cluster association processing (see FIGS. 16 and 17) in Embodiments 1 to 3, each cluster is associated with a cluster having the largest number of common objects with the cluster, among clusters having at least a predetermined number of common objects with the cluster.

However, the processing may be modified as follows to associate a cluster with a cluster having at least a predetermined number of common objects with the cluster.

(a) The processing steps of S1605 to S1610 may be cancelled upon one association candidate being found. Then, the cluster i may be associated with said one association candidate (step S1612). In this case, the cluster i is associated with a cluster that is found first among clusters having at least a predetermined number of common objects with the cluster i.

(b) In steps S1605 to S1610, the processing is performed while the threshold z is updated (step S1608) every time an association candidate is found. However, the threshold z does not always need to be updated. In this case, the cluster i is associated with a cluster that is found last among clusters having at least a predetermined number of common objects with the cluster i.

(c) If there is more than one association candidate, clustering in either the divided period n or the divided period n+1 may be performed again by raising the categorization sensitivity, so that only one association candidate is found. To raise the categorization sensitivity in clustering, the number of clusters K generated in the K-means method may be increased to be larger than the number of clusters K originally set, for example.

(d) The cluster i may be associated with a plurality of clusters that are association candidates.

For example, it is possible to perform the following processing to associate the cluster i with all clusters that are association candidates. That is, the processing of steps S1611 and S1612 may be omitted. Then, instead of steps S1607 and S1608, processing for associating the cluster i and the cluster j may be performed. In this case, the processing for acquiring associated clusters, which is performed during the search processing (see FIG. 19), needs to be modified as well.

Also, it is possible to create cluster group information by combining with the modification (4)(d). In this case, the processing for associating the cluster i and the cluster j as described above will be processing for adding the cluster j to an associated cluster ID group including the cluster i.

(17) According to the period division processing in Embodiments 2 and 3, the divided periods are determined such that the ending date and time of the most recent divided period is the shooting date and time of the most recent object. However, in the case where the determination is performed such that the most recent divided period includes the shooting date and time of the most recent object, the ending date and time of the most recent divided period may be set to a date and time different from the shooting date and time of the most recent object.

For example, the ending date and time of the most recent divided period may be set to the current date and time or the starting date and time of the most recent divided period+$\Delta T$.

(18) In step S2101a in the period division processing according to Embodiment 3, the date and time d is a birth date and is set to 0 hours, 0 minutes, and 0 seconds. However, the time does not need to be set to 0 hours, 0 minutes, and 0 seconds, as long as the date and time d is data including the birth date. For example, it is possible to let the user input the time to the hour, minute, and second.

(19) According to the cluster association processing in Embodiments 1 to 3, the variable i is set to the cluster ID of the first cluster in the divided period n in step S1602. However, clusters may be selected in any order as long as the processing is performed on every cluster generated in the divided period n.

(20) The following points described in the above embodiments are merely examples, and may be freely changed as necessary.

(a) A unit from which the image management device receives a user operation is not limited to the controller 130. For example, it is possible to use a display with a touch panel, instead of the controller 130.

(b) A unit for storing the data and the programs is not limited to the memory. For example, it is possible to use a hard disk or the like, instead of the memory.

(c) The structures of the search screen and the result screen are not limited to those described in the above embodiments.

(d) The method for identifying each of the images, objects, divided periods, clusters, and association information pieces is not limited to the file names and IDs as described above. For example, the image acquisition unit 201 may provide an image ID to each image so as to identify each image by the corresponding image ID.

(e) The conditions for starting the image storage processing and the search processing are not limited to those described above.

(21) Regarding the present invention, a control program composed of program codes may be recorded on a recording medium or distributed via various communication channels or the like, the program codes being for causing a processor in the image management device and circuits connected to the processor to perform the image storage processing (see FIGS. 13 to 17), the search processing (see FIGS. 18 to 19), etc. Examples of the recording medium include an IC card, a hard disk, an optical disc, a flexible disk, a ROM, etc. The control program thus distributed may be stored in a processor-readable memory or the like so as to be available for use. The functions described in the above embodiments are realized by a processor executing the control program. Note that a part of the control program may be transmitted, via any of various networks, to a device (processor) that is capable of executing a program and is different from the image management device, so as to cause the device to execute the part of the control program.

(22) Parts or all of the components of the image management device may be implemented as one or more integrated circuits (IC, LSI, etc). Furthermore, the parts or all components of the image management device may be combined with a different component to be integrated into one chip.

(23) The present invention may be any combination of the above modifications.

6. Conclusion

The following describes the structure and effects of the object associating device according to the present invention.

(1) The present invention provides an object associating device comprising: a storage unit storing therein a plurality of contents and a plurality of generation time information pieces in one-to-one correspondence, each generation time information piece indicating time at which the corresponding content was generated; a categorizing unit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and an associating unit configured to, when a number of objects belonging to both the first group and the second group is greater than or equal to a predetermined number, associate the objects belonging to the first group with the objects belonging to the second group as objects indicating a same entity.

Here, each object is included in a different one of the contents. Thus, one object is not included in more than one content.

Even if the feature of each object indicating the same entity changes in a combined period, which is composed of the first period and the second period, the change of the entity in each of the first period and the second period that are shorter than the combined period is considered to be smaller than the change of the entity in the combined period.

Therefore, categorizing the objects in each of the first period and the second period is less susceptible to the change of the features of the objects over time than categorizing the objects in the entirety of the combined period. This makes it possible to accurately categorize the objects indicating the same entity into the same group.

Also, the entity indicated by the objects belonging to both the first group and the second group is the same as the entity indicated by the objects only belonging to the first group and the objects only belonging to the second group.

Therefore, if the number of objects belonging to both the first group and the second group is greater than or equal to the predetermined number, the objects only belonging to the first group, the objects only belonging to the second group, and the objects belonging to both the first group and the second group all indicate the same entity. Accordingly, the object associating device associates the objects belonging to the first group with the objects belonging to the second group.

As described above, the object associating device associates objects in the combined period composed of the first period and the second period, with use of the result of categorization accurately performed in each of the first period and the second period. Therefore, objects indicating the same entity are associated more accurately than in the conventional technology.

A result of the association can be used for processing that is performed based on the sameness of objects. Examples of such processing include searching and sorting.

In the above embodiments, the storage unit is realized by the image storage unit 202; the categorizing unit is realized by the clustering unit 206; and the associating unit is realized by the cluster associating unit 208. Also, in the above embodiments, the generation time information pieces correspond to the shooting dates and times 303; and the groups correspond to the clusters.

The cluster associating unit 208 associates clusters, and the clustering unit 206 associates objects belonging to the same cluster. This means that objects belonging to each of the clusters that are associated by the cluster associating unit 208 are also associated.

(2) Regarding the item (1) above, the contents may be images, and the object associating device may further comprise an extracting unit configured to detect an object included in each of the images, and extract a feature value of each of the objects thus detected, and the categorizing unit may categorize the objects with use of the feature value of each of the objects.

This makes it possible to associate objects included in the respective images. This structure is useful in identifying a photo-subject shown in a picture or the like.

In the above embodiments, the extracting unit is realized by the object detection unit 203.

(3) Regarding the item (2) above, the object associating device may further comprise a determination unit configured to determine the first period and the second period, such that (i) a total number of objects is a fixed number greater than or equal to one in an overlapping period in which the first period and the second period partially overlap each other, the objects being included in images corresponding to generation time information pieces each indicating time within the overlapping period, (ii) the total number of objects is greater than the fixed number in the first period, the objects being included in images corresponding to generation time information pieces each indicating time within the first period, and (iii) the total number of objects is greater than the fixed number in the second period, the objects being included in images corresponding to generation time information pieces each indicating time within the second period.

This makes it possible to avoid a situation where association processing cannot be performed due to the number of objects included in the overlapping period being insufficient.

In Embodiment 1, the determination unit corresponds to the period dividing unit 205.

(4) Regarding the item (3) above, the objects may be human faces, and the extracting unit may detect the objects by specifying the human faces according to a criterion for human face detection, and extracts the feature value of each of the human faces thus detected.

This makes it possible to associate the human faces included in the respective images. This structure is useful in identifying people shown in a picture or the like.

(5) Regarding the item (2) above, the object associating device may further comprise a determination unit configured to determine the first period and the second period, such that (i) an overlapping period in which the first period and the second period partially overlap each other coincides with a predetermined length and (ii) each of the first period and the second period is longer than the predetermined length.

This makes it possible to determine the first period and the second period without relying on the number of objects included in the overlapping period.

In Embodiments 2 and 3, the determination unit is realized by the period dividing unit 205.

(6) Regarding the item (5) above, the objects may be human faces, and the determination unit may calculate an age of a person in each of the first period and the second period, and determine a length of each of the first period and the second period based on the age thus calculated.

The rate of change in the feature value of a person varies depending on the age of the person. For example, when the person is relatively young, the feature value of the person significantly changes over time due to growth. Then, when the person becomes an adult, a change in the feature value of the person becomes small.

Therefore, in the case where objects indicating a specific person are to be associated, the above structure may be employed so as to determine the first period and the second period such that the length of each period corresponds to the growth of the person. As a result, the objects are more accurately associated.

(7) Regarding the item (6) above, each of the generation time information pieces may include a date, the object associating device may further comprise: a date storage unit storing therein a reference date for calculation of the age of the person in each of the first period and the second period; and a period length storage unit storing therein a plurality of ages and a plurality of lengths of periods in one-to-one correspondence, wherein the determination unit may calculate the age based on the reference date, and determine the length of each of the first period and the second period to be a length corresponding to the age thus calculated with reference to the ages and the lengths of periods that are stored in the period length storage unit.

This makes it possible to calculate the age of a specific person, with use of the reference date (birth date), and perform the association processing while focusing on the specific person.

In Embodiment 3, the date storage unit is realized by the birth date storage unit 2201, and the period length storage unit is realized by the period length correspondence table storage unit 2202.

(8) Regarding the item (2) above, the object associating device may further comprise a determination unit configured to determine the first period and the second period, such that (i) a total number of images is a fixed number greater than or equal to one in an overlapping period in which the first period and the second period partially overlap each other, the images corresponding to generation time information pieces each indicating time within the overlapping period, (ii) the total number of images is greater than the fixed number in the first period, the images corresponding to generation time information pieces each indicating time within the first period, and (iii) the total number of images is greater than the fixed number in the second period, the images corresponding to generation time information pieces each indicating time within the second period.

This makes it possible to avoid a situation where association processing cannot be performed due to the number of objects included in the overlapping period being insufficient, which results from the number of images included in the overlapping period being insufficient.

(9) Regarding the item (1) above, the object associating device may further comprise a dividing unit configured to divide a period into a plurality of sub-periods such that adjacent sub-periods on a time axis partially overlap each other, wherein the categorizing unit may perform categorization with respect to each of the sub-periods, and the associating unit may associate each pair of the adjacent sub-periods on the time axis by setting a preceding one of the pair as the first period and a subsequent one of the pair as the second period.

By associating each pair of the adjacent sub-periods, the association of objects is accurately performed even in a long period composed of a plurality of first periods and a plurality of second periods.

For example, suppose that objects belonging to a cluster a generated in a period A are associated with objects in a cluster b generated in a period B, and that the objects belonging to the cluster b are associated with objects belonging to a cluster c generated in a period C. In this case, the objects belonging to the cluster a are also associated with the objects belonging to the cluster c, via the cluster b.

In the above embodiments, the dividing unit is realized by the period dividing unit 205.

(10) The present invention may have the following structures.

A first aspect of the present invention is an object associating device comprising: a memory storing therein a plurality of contents and a plurality of generation time information pieces in one-to-one correspondence, each generation time information piece indicating time at which the corresponding content was generated; a categorizing circuit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and an associating circuit configured to, when a number of objects belonging to both the first group and the second group is greater than or equal to a predetermined number, associate the objects belonging to the first group with the objects belonging to the second group as objects indicating a same entity.

A second aspect of the present invention is an object associating device comprising: an integrated circuit; and a memory storing therein a plurality of contents and a plurality of generation time information pieces in one-to-one correspondence, each generation time information piece indicating time at which the corresponding content was generated. The integrated circuit includes: a categorizing circuit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and an associating circuit configured to, when a number of objects belonging to both the first group and the second group is greater than or equal to a predetermined number, associate the objects belonging to the first group with the objects belonging to the second group as objects indicating a same entity.

A third aspect of the present invention is an object associating device comprising: a memory storing therein a computer program composed of a plurality of computer instructions; and a processor configured to read and decode the computer instructions one by one from the computer program, and to operate according to a result of the decoding. The memory stores therein a plurality of contents and a plurality of generation time information pieces in one-to-one correspondence, each generation time information piece indicating time at which the corresponding content was generated. The computer program causes the processor to perform the steps of: categorizing objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and when a number of objects belonging to both the first group and the second group is greater than or equal to a predetermined number, associating the objects belonging to the first group with the objects belonging to the second group as objects indicating a same entity.

A fourth aspect of the present invention is a non-transitory computer-readable recording medium storing thereon a computer program used in an object associating device. The object associating device comprises a memory storing therein a plurality of contents and a plurality of generation time information pieces in one-to-one correspondence, each generation time information piece indicating time at which the corresponding content was generated. The computer program causes a computer to perform the steps of: categorizing objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and when a number of objects belonging to both the first group and the second group is greater than or equal to a predetermined number, associating the objects belonging to the first group with the objects belonging to the second group as objects indicating a same entity.

INDUSTRIAL APPLICABILITY

An object associating device according to the present invention is applicable to an image search device, a file server, a digital camera, and the like.

REFERENCE SIGNS LIST 100, 100a, 100b image management device
100c object associating device
101 storage unit
102 categorizing unit
103 associating unit
110 image capturing device
120 display device
130 controller
201 image acquisition unit
202 image storage unit
203 object detection unit
204 object storage unit
205 period dividing unit
206 clustering unit
207 cluster storage unit
208 cluster associating unit
209 association information storage unit
210 operation input unit
211 search unit
212 output unit
2201 birth date storage unit
2202 period length correspondence table storage unit

The invention claimed is:
1. An object associating device comprising:
a non-transitory memory device that stores a program and includes storage unit storing therein a plurality of contents and a plurality of generation time information pieces in one-to-one correspondence, each generation time information piece indicating time at which the corresponding content was generated; and
a processing device that executes the program to cause the object associating device to operate as:
a categorizing unit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other;
an associating unit configured to, when a number of objects belonging to both the first group and the second group is greater than or equal to a predetermined number, associate the objects belonging to the first group with the objects belonging to the second group as objects indicating a same entity; and
an extracting unit,
wherein the contents are images,
wherein the extracting unit is configured to detect an object included in each of the images, and extract a feature value of each of the objects thus detected,
wherein the categorizing unit categorizes the objects with use of the feature value of each of the objects, and
wherein the program causes the object associating device to further operate as
a determination unit configured to determine the first period and the second period, such that (i) a total number of objects is a fixed number greater than or equal to one in an overlapping period in which the first period and the second period partially overlap each other, the objects being included in images corresponding to generation time information pieces each indicating time within the overlapping period, (ii) the total number of objects is greater than the fixed number in the first period, the objects being included in images corresponding to generation time information pieces each indicating time within the first period, and (iii) the total number of objects is greater than the fixed number in the second period, the objects being included in images corresponding to generation time information pieces each indicating time within the second period.
2. The object associating device of claim 1,
wherein the objects are human faces, and
wherein the extracting unit detects the objects by specifying the human faces according to a criterion for human face detection, and extracts the feature value of each of the human faces thus detected.
3. An object associating device comprising:
a non-transitory memory device that stores a program and includes storage unit storing therein a plurality of contents and a plurality of generation time information pieces in one-to-one correspondence, each generation time information piece indicating time at which the corresponding content was generated; and
a processing device that executes the program to cause the object associating device to operate as:

a categorizing unit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other;

an associating unit configured to, when a number of objects belonging to both the first group and the second group is greater than or equal to a predetermined number, associate the objects belonging to the first group with the objects belonging to the second group as objects indicating a same entity; and an extracting unit, wherein the contents are images, wherein the extracting unit is configured to detect an object included in each of the images, and extract a feature value of each of the objects thus detected, wherein the categorizing unit categorizes the objects with use of the feature value of each of the objects, and wherein the program causes the object associating device to further operate as a determination unit configured to determine the first period and the second period, such that (i) an overlapping period in which the first period and the second period partially overlap each other coincides with a predetermined length and (ii) each of the first period and the second period is longer than the predetermined length.

4. The object associating device of claim 3, wherein the objects are human faces, and wherein the determination unit calculates an age of a person in each of the first period and the second period, and determines a length of each of the first period and the second period based on the age thus calculated.

5. The object associating device of claim 4, wherein the program causes the object associating device to further operate as:

a date storage unit; and a period length storage unit, wherein each of the generation time information pieces includes a date, wherein the date storage unit stores therein a reference date for calculation of the age of the person in each of the first period and the second period, wherein the period length storage unit stores therein a plurality of ages and a plurality of lengths of periods in one-to-one correspondence, and wherein the determination unit calculates the age based on the reference date, and determines the length of each of the first period and the second period to be a length corresponding to the age thus calculated with reference to the ages and the lengths of periods that are stored in the period length storage unit.

6. An object associating device comprising:

a non-transitory memory device that stores a program and includes storage unit storing therein a plurality of contents and a plurality of generation time information pieces in one-to-one correspondence, each generation time information piece indicating time at which the corresponding content was generated; and a processing device that executes the program to cause the object associating device to operate as:

a categorizing unit configured to categorize objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other;

an associating unit configured to, when a number of objects belonging to both the first group and the second group is greater than or equal to a predetermined number, associate the objects belonging to the first group with the objects belonging to the second group as objects indicating a same entity; and an extracting unit, wherein the contents are images, wherein the extracting unit is configured to detect an object included in each of the images, and extract a feature value of each of the objects thus detected, wherein the categorizing unit categorizes the objects with use of the feature value of each of the objects, and wherein the program causes the object associating device to further operate as a determination unit configured to determine the first period and the second period, such that (i) a total number of images is a fixed number greater than or equal to one in an overlapping period in which the first period and the second period partially overlap each other, the images corresponding to generation time information pieces each indicating time within the overlapping period, (ii) the total number of images is greater than the fixed number in the first period, the images corresponding to generation time information pieces each indicating time within the first period, and (iii) the total number of images is greater than the fixed number in the second period, the images corresponding to generation time information pieces each indicating time within the second period.

7. The object associating device of claim 1, wherein the program causes the object associating device to further operate as a dividing unit configured to divide a period into a plurality of sub-periods such that adjacent sub-periods on a time axis partially overlap each other, wherein the categorizing unit performs categorization with respect to each of the sub-periods, and wherein the associating unit associates each pair of the adjacent sub-periods on the time axis by setting a preceding one of the pair as the first period and a subsequent one of the pair as the second period.

8. An object associating method comprising the steps of:

storing, using a processor, a plurality of contents and a plurality of generation time information pieces in one-to-one correspondence, each generation time information piece indicating time at which the corresponding content was generated;

categorizing, using the processor, objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and when a number of objects belonging to both the first group and the second group is greater than or equal to a predetermined number, associating, using the processor, the objects belonging to the first group with the objects belonging to the second group as objects indicating a same entity, wherein the contents are images, wherein the object associating method further comprises:
  detecting, using the processor, an object included in each of the images; and
  extracting, using the processor, a feature value of each of the objects thus detected, wherein the objects are categorized with use of the feature value of each of the objects, and wherein the object associating method further comprises:
  determining, using the processor, the first period and the second period, such that (i) a total number of images is a fixed number greater than or equal to one in an overlapping period in which the first period and the second period partially overlap each other, the images corresponding to generation time information pieces each indicating time within the overlapping period, (ii) the total number of images is greater than the fixed number in the first period, the images corresponding to generation time information pieces each indicating time within the first period, and (iii) the total number of images is greater than the fixed number in the second period, the images corresponding to generation time information pieces each indicating time within the second period.

9. A non-transitory recording medium storing thereon a program for causing a computer to perform processing comprising the steps of:

storing a plurality of contents and a plurality of generation time information pieces in one-to-one correspondence, each generation time information piece indicating time at which the corresponding content was generated;

categorizing objects into groups including a first group and a second group according to the generation time information pieces and similarity of the objects, the objects being included in contents corresponding to generation time information pieces each indicating time within a first period and a second period that partially overlap each other, the first group being composed of objects that are included in contents corresponding to generation time information pieces each indicating time within the first period and are similar to each other, and the second group being composed of objects that are included in contents corresponding to generation time information pieces each indicating time within the second period and are similar to each other; and when a number of objects belonging to both the first group and the second group is greater than or equal to a predetermined number, associating the objects belonging to the first group with the objects belonging to the second group as objects indicating a same entity, wherein the contents are images, wherein the processing further comprises:
  detecting an object included in each of the images; and
  extracting a feature value of each of the objects thus detected, wherein the objects are categorized with use of the feature value of each of the objects, and wherein the processing further comprises:
  determining the first period and the second period, such that (i) a total number of images is a fixed number greater than or equal to one in an overlapping period in which the first period and the second period partially overlap each other, the images corresponding to generation time information pieces each indicating time within the overlapping period, (ii) the total number of images is greater than the fixed number in the first period, the images corresponding to generation time information pieces each indicating time within the first period, and (iii) the total number of images is greater than the fixed number in the second period, the images corresponding to generation time information pieces each indicating time within the second period.

* * * * *